United States Patent
Simon et al.

(10) Patent No.: US 10,560,299 B2
(45) Date of Patent: Feb. 11, 2020

(54) MULTI-PORTION RADIO TRANSMISSIONS

(71) Applicants: Coherent Logix, Incorporated, Austin, TX (US); Sinclair Television Group, Inc., Cockeysville, MD (US)

(72) Inventors: Michael J. Simon, Frederick, MD (US); Kevin A. Shelby, Austin, TX (US); Mark Earnshaw, Kanata (CA)

(73) Assignees: COHERENT LOGIX, INCORPORATED, Austin, TX (US); SINCLAIR TELEVISION GROUP, INC., Cockeysville, MD (US)

( * ) Notice: Subject to any disclaimer, the term of this patent is extended or adjusted under 35 U.S.C. 154(b) by 0 days.

(21) Appl. No.: 16/025,390

(22) Filed: Jul. 2, 2018

(65) Prior Publication Data

US 2018/0309610 A1     Oct. 25, 2018

Related U.S. Application Data

(63) Continuation of application No. 15/247,198, filed on Aug. 25, 2016, now Pat. No. 10,033,566, which is a
(Continued)

(51) Int. Cl.
    *H04L 27/26*     (2006.01)
    *H04L 12/18*     (2006.01)
    (Continued)

(52) U.S. Cl.
    CPC ......... *H04L 27/2649* (2013.01); *H04H 20/42* (2013.01); *H04L 5/0007* (2013.01);
    (Continued)

(58) Field of Classification Search
    CPC ............. H04L 27/2607; H04L 27/2633; H04L 27/2659; H04L 27/266; H04L 27/2678
    See application file for complete search history.

(56) References Cited

U.S. PATENT DOCUMENTS

| | | |
|---|---|---|
| 6,961,388 B2 | 11/2005 | Ling |
| 7,002,904 B2 | 2/2006 | Jung |

(Continued)

FOREIGN PATENT DOCUMENTS

| | | |
|---|---|---|
| CN | 101208887 A | 6/2008 |
| CN | 101459491 A | 6/2009 |

(Continued)

OTHER PUBLICATIONS

Search Report, dated Mar. 20, 2018, for Chinese Patent Appl. No. 201580050598.8, 2 pages.
(Continued)

*Primary Examiner* — Janice N Tieu
(74) *Attorney, Agent, or Firm* — Kowert Hood Munyon Rankin & Goetzel, P.C.; Jeffrey C. Hood

(57) ABSTRACT

Techniques are disclosed relating to generating and receiving radio frames with multiple portions that have different encoding schemes. An apparatus may include one or more processing elements configured to receive, via a wireless radio, wireless data that includes a plurality of portions that each include multiple orthogonal frequency-division multiplexing (OFDM) symbols. Different ones of the portions have different frequency transform sizes and different sampling rates. The wireless data may also include control data that indicates the frequency transform sizes and sampling rates for the ones of the portions. The apparatus may select, based on the control data and a determined velocity of the apparatus, one or more but not all of the plurality of portions and may decode the selected one or more portions to determine data represented by the OFDM symbols in the selected one or more portions. Different portions of the wireless data may be adapted for decoding by devices moving at different maximum velocities.

19 Claims, 18 Drawing Sheets

---

Receive or generate a payload region for a frame of wireless data, wherein the payload region includes a plurality of partitions that each include multiple orthogonal frequency-division multiplexing (OFDM) symbols, wherein different ones of the partitions have different frequency transform sizes for the OFDM symbols in the ones of the partitions
*1710*

Broadcast the frame of wireless data including the payload region
*1720*

Related U.S. Application Data continuation of application No. 14/805,004, filed on Jul. 21, 2015, now Pat. No. 9,438,459.

(60) Provisional application No. 62/034,626, filed on Aug. 7, 2014.

(51) Int. Cl.
  *H04L 5/00* (2006.01)
  *H04H 20/42* (2008.01)
  *H04W 72/00* (2009.01)
  *H04W 72/04* (2009.01)

(52) U.S. Cl.
  CPC .......... *H04L 5/0044* (2013.01); *H04L 5/0094* (2013.01); *H04L 12/189* (2013.01); *H04L 27/2602* (2013.01); *H04L 27/2627* (2013.01); *H04W 72/005* (2013.01); *H04W 72/0446* (2013.01)

(56) References Cited

U.S. PATENT DOCUMENTS

| | | |
|---|---|---|
| 7,020,072 B1 | 3/2006 | Li |
| 7,088,782 B2 | 8/2006 | Mody |
| 7,327,795 B2 | 2/2008 | Oprea |
| 7,415,080 B2 | 8/2008 | Echavarri |
| 7,499,496 B2 | 3/2009 | Fujii |
| 7,756,002 B2 | 7/2010 | Batra |
| 7,756,208 B2 | 7/2010 | Bykovnikov |
| 7,830,921 B2 | 11/2010 | Liebchen |
| 7,920,884 B2 | 4/2011 | Agrawal |
| 8,027,367 B2 | 9/2011 | Li |
| 8,144,571 B2* | 3/2012 | Lee .............. H04L 5/0007 370/204 |
| 8,351,319 B2 | 1/2013 | Parkvall |
| 8,406,323 B2 | 3/2013 | Huang |
| 8,442,134 B2 | 5/2013 | Bury |
| 8,577,299 B2 | 11/2013 | Agrawal |
| 8,654,696 B2* | 2/2014 | Fukuoka ............ H04L 27/2613 370/312 |
| 8,738,001 B2 | 5/2014 | Fahldieck |
| 8,761,303 B2 | 6/2014 | Griot |
| 8,804,675 B2 | 8/2014 | Gutierrez |
| 8,873,651 B2 | 10/2014 | Muhammad |
| 8,942,336 B2 | 1/2015 | Ghosh |
| 8,982,788 B2 | 3/2015 | Han |
| 9,001,918 B2 | 4/2015 | Taori |
| 9,036,567 B2 | 5/2015 | Krishmnoorthi |
| 9,037,093 B2 | 5/2015 | Smith |
| 9,043,687 B2 | 5/2015 | Ko |
| 9,179,440 B2 | 11/2015 | Gutierrez |
| 9,184,794 B1 | 11/2015 | Ibrahim |
| 9,203,674 B2 | 12/2015 | Kobayashi |
| 9,253,428 B2 | 2/2016 | Allison |
| 9,258,800 B2 | 2/2016 | Kwak |
| 9,300,327 B2 | 3/2016 | Ko |
| 9,307,273 B2 | 4/2016 | Yoo |
| 9,325,554 B2 | 4/2016 | Yokokawa |
| 9,363,040 B2 | 6/2016 | Ko |
| 9,369,325 B2 | 6/2016 | Kim |
| 9,374,141 B2 | 6/2016 | Murakami |
| 9,374,198 B2 | 6/2016 | Fong |
| 9,386,562 B2 | 7/2016 | Gutierrez |
| 9,425,836 B2 | 8/2016 | Wang |
| 9,425,880 B2 | 8/2016 | Kim |
| 9,571,322 B2 | 2/2017 | Bae |
| 9,692,630 B2 | 6/2017 | Qi |
| 9,698,962 B2 | 7/2017 | Rajagopalan |
| 9,699,012 B2 | 7/2017 | Mun |
| 9,853,851 B2 | 12/2017 | Simon |
| 9,866,421 B2 | 1/2018 | Simon |
| 9,954,917 B2 | 4/2018 | Park |
| 2002/0150126 A1 | 10/2002 | Kovacevic |
| 2002/0155811 A1 | 10/2002 | Prismantas et al. |
| 2003/0072255 A1 | 4/2003 | Ma |
| 2003/0123383 A1 | 7/2003 | Korobkov |
| 2004/0081131 A1 | 4/2004 | Walton |
| 2004/0218519 A1 | 11/2004 | Chiou |
| 2005/0220002 A1 | 10/2005 | Li |
| 2005/0265488 A1 | 12/2005 | Jung |
| 2006/0002367 A1 | 1/2006 | Lee |
| 2006/0062317 A1 | 3/2006 | Chang et al. |
| 2006/0072649 A1 | 4/2006 | Chang |
| 2007/0058595 A1 | 3/2007 | Classon |
| 2007/0242600 A1 | 10/2007 | Li |
| 2007/0280098 A1 | 12/2007 | Bhatt |
| 2008/0037679 A1 | 2/2008 | Khan |
| 2008/0084845 A1 | 4/2008 | Kuchibhotla |
| 2008/0095195 A1 | 4/2008 | Ahmadi |
| 2008/0130485 A1 | 6/2008 | Yang |
| 2008/0186843 A1 | 8/2008 | Ma |
| 2008/0222482 A1 | 9/2008 | Ban |
| 2008/0287068 A1 | 11/2008 | Etemad |
| 2008/0298490 A1 | 12/2008 | Yun |
| 2009/0028258 A1 | 1/2009 | Ma |
| 2009/0040970 A1 | 2/2009 | Ahmadi |
| 2009/0080406 A1 | 3/2009 | Gopal et al. |
| 2009/0082002 A1 | 3/2009 | Kim |
| 2009/0110092 A1 | 4/2009 | Taylor |
| 2009/0110094 A1 | 4/2009 | Taylor |
| 2009/0215499 A1 | 8/2009 | Moon |
| 2009/0219842 A1 | 9/2009 | Moon |
| 2009/0296645 A1 | 12/2009 | Bui |
| 2010/0027486 A1 | 2/2010 | Gorokhov |
| 2010/0085985 A1 | 4/2010 | Pekonen |
| 2010/0086087 A1 | 4/2010 | Pekonen |
| 2010/0098025 A1 | 4/2010 | Chen |
| 2010/0110874 A1 | 5/2010 | Kang |
| 2010/0111014 A1 | 5/2010 | Kang |
| 2010/0118806 A1 | 5/2010 | Griot |
| 2010/0149961 A1 | 6/2010 | Lee |
| 2010/0150056 A1 | 6/2010 | Iwai |
| 2010/0165914 A1 | 7/2010 | Cho |
| 2010/0202371 A1 | 8/2010 | Josiam |
| 2010/0220666 A1 | 9/2010 | Imamura |
| 2010/0226322 A1 | 9/2010 | Choi |
| 2010/0226426 A1 | 9/2010 | Tupala |
| 2010/0246726 A1 | 9/2010 | Asjadi |
| 2010/0278123 A1 | 11/2010 | Fong |
| 2010/0309384 A1 | 12/2010 | Asjadi |
| 2010/0310016 A1 | 12/2010 | Okehie |
| 2011/0013732 A1 | 1/2011 | Atungsiri |
| 2011/0044406 A1 | 2/2011 | Insenser Farre |
| 2011/0051634 A1 | 3/2011 | Lim |
| 2011/0051649 A1 | 3/2011 | Josiam |
| 2011/0051688 A1 | 3/2011 | Lee |
| 2011/0055887 A1 | 3/2011 | Vare |
| 2011/0058527 A1 | 3/2011 | Choi |
| 2011/0069790 A1 | 3/2011 | Okehie |
| 2011/0085507 A1 | 4/2011 | Jongren |
| 2011/0211541 A1 | 9/2011 | Yuk |
| 2011/0261677 A1 | 10/2011 | Kim |
| 2011/0299493 A1 | 12/2011 | Gutierrez |
| 2012/0033589 A1 | 2/2012 | Zheng |
| 2012/0050547 A1 | 3/2012 | Gaddam |
| 2012/0076127 A1 | 3/2012 | Mourad |
| 2012/0093080 A1 | 4/2012 | Lee |
| 2012/0134440 A1 | 5/2012 | Yun |
| 2012/0140836 A1 | 6/2012 | Helard |
| 2012/0151547 A1 | 6/2012 | Mourad |
| 2012/0170506 A1 | 7/2012 | Chun |
| 2012/0183107 A1 | 7/2012 | Zhu |
| 2012/0188878 A1 | 7/2012 | Simon |
| 2012/0224472 A1 | 9/2012 | Kim |
| 2012/0324523 A1 | 12/2012 | Stadelmeier |
| 2013/0170409 A1 | 7/2013 | Ihm |
| 2013/0223457 A1 | 8/2013 | Pande et al. |
| 2013/0279614 A1 | 10/2013 | Walton |
| 2013/0294364 A1* | 11/2013 | Jul ............ H04J 13/20 370/329 |
| 2013/0315320 A1 | 11/2013 | McGowan |
| 2014/0092800 A1 | 4/2014 | Cho |
| 2014/0112274 A1 | 4/2014 | Moon |

(56) References Cited

U.S. PATENT DOCUMENTS

| | | |
|---|---|---|
| 2014/0150014 A1 | 5/2014 | Aitken |
| 2014/0169502 A1 | 6/2014 | Lovell |
| 2014/0198875 A1 | 7/2014 | Kim |
| 2014/0211775 A1 | 7/2014 | Sampath |
| 2014/0294124 A1 | 10/2014 | Atungsiri |
| 2015/0006586 A1 | 1/2015 | Mourad |
| 2015/0036765 A1 | 2/2015 | Yun |
| 2015/0043491 A1 | 2/2015 | Eng |
| 2015/0049642 A1 | 2/2015 | Eng |
| 2015/0049712 A1 | 2/2015 | Chen |
| 2015/0055727 A1 | 2/2015 | Kim |
| 2015/0058908 A1 | 2/2015 | Ko |
| 2015/0078292 A1 | 3/2015 | Walker |
| 2015/0085735 A1 | 3/2015 | Shelby |
| 2015/0181281 A1 | 6/2015 | Ko |
| 2015/0195067 A1 | 7/2015 | Kim |
| 2015/0215008 A1 | 7/2015 | Cho |
| 2015/0236884 A1 | 8/2015 | Suh |
| 2015/0256308 A1 | 9/2015 | Ma |
| 2015/0270889 A1 | 9/2015 | Shoshan et al. |
| 2015/0304070 A1 | 10/2015 | Baek |
| 2015/0358106 A1 | 12/2015 | Limberg |
| 2016/0006593 A1 | 1/2016 | Asjadi |
| 2016/0036613 A1 | 2/2016 | Mun |
| 2016/0043830 A1 | 2/2016 | Simon |
| 2016/0050097 A1 | 2/2016 | Atungsiri |
| 2016/0057504 A1 | 2/2016 | Shelby |
| 2016/0065337 A1 | 3/2016 | Atungsiri |
| 2016/0094970 A1 | 3/2016 | Oh |
| 2016/0105223 A1 | 4/2016 | Baek |
| 2016/0119908 A1 | 4/2016 | Kwak |
| 2016/0142237 A1 | 5/2016 | Atungsiri |
| 2016/0164541 A1 | 6/2016 | Ko |
| 2016/0164637 A1 | 6/2016 | Suh |
| 2016/0165273 A1 | 6/2016 | Moon |
| 2016/0165274 A1 | 6/2016 | Moon |
| 2016/0173312 A1 | 6/2016 | Moon |
| 2016/0191288 A1 | 6/2016 | Baek |
| 2016/0198217 A1 | 7/2016 | Ko |
| 2016/0241358 A1 | 8/2016 | Ko |
| 2016/0241365 A1 | 8/2016 | Bae |
| 2017/0026221 A1 | 1/2017 | Atungsiri |
| 2017/0054581 A1 | 2/2017 | Simon |
| 2017/0163394 A1 | 6/2017 | Choi |
| 2017/0201395 A1 | 7/2017 | Jia |
| 2017/0207873 A1 | 7/2017 | Shelby |
| 2017/0207942 A1 | 7/2017 | Mun |
| 2017/0207945 A1 | 7/2017 | Shelby |
| 2017/0237591 A1 | 8/2017 | Atungsiri |
| 2017/0303163 A1 | 10/2017 | Sharma |
| 2017/0338994 A1 | 11/2017 | Atungsiri |
| 2017/0339453 A1 | 11/2017 | Kwon |
| 2018/0077471 A1 | 3/2018 | Takahashi |
| 2018/0205509 A1 | 7/2018 | Atungsiri |

FOREIGN PATENT DOCUMENTS

| | | |
|---|---|---|
| CN | 105007145 A | 10/2015 |
| CN | 105007146 A | 10/2015 |
| CN | 105024791 A | 11/2015 |
| CN | 105024952 A | 11/2015 |
| CN | 105024963 A | 11/2015 |
| CN | 105245479 A | 1/2016 |
| CN | 105282076 A | 1/2016 |
| CN | 105282078 A | 1/2016 |
| CN | 105323048 A | 2/2016 |
| CN | 105743624 A | 7/2016 |
| CN | 105991266 A | 10/2016 |
| CN | 105991495 A | 10/2016 |
| CN | 105991498 A | 10/2016 |
| CN | 105991500 A | 10/2016 |
| CN | 105991501 A | 10/2016 |
| CN | 105991502 A | 10/2016 |
| EP | 2 151 945 A2 | 2/2010 |
| EP | 2393227 | 7/2011 |
| EP | 2393227 A2 | 12/2011 |
| JP | 2013-510467 A | 3/2013 |
| JP | 2013-102466 A | 5/2013 |
| JP | 2013-219778 A | 10/2013 |
| WO | WO 2007/098482 A2 | 8/2007 |
| WO | 2009/000185 | 12/2008 |
| WO | 2009000185 A1 | 12/2008 |

OTHER PUBLICATIONS

Communication pursuant to Rule 164(1) EPC, dated Mar. 21, 2018, for European Patent Appl. No. 15829279.7, 14 pages.

English translation for Chinese patent publication No. CN 105007145 A, published Oct. 28, 2015, 17 pages, translated by Google at https://patents.google.com.

English translation for Chinese patent publication No. CN 105007146 A, published Oct. 28, 2015, 17 pages, translated by Google at https://patents.google.com.

English translation for Chinese patent publication No. CN 105024 791 A, published Nov. 4, 2015, 14 pages, translated by Google at https://patents.google.com.

English translation for Chinese patent publication No. CN 105024952 A, published Nov. 4, 2015, 20 pages, translated by Google at https://patents.google.com.

English translation for Chinese patent publication No. CN 105024963 A, published Nov. 4, 2015, 23 pages, translated by Google at https://patents.google.com.

English translation for Chinese patent publication No. CN 105245479 A, published Jan. 13, 2016, 28 pages, translated by Google at https://patents.google.com.

English translation for Chinese patent publication No. CN 105282076 A, published Jan. 27, 2016, 21 pages, translated by Google at https://patents.google.com.

English translation for Chinese patent publication no. CN 105282078 A, published Jan. 27, 2016, 24 pages, translated by Google at https://patents.google.com.

English translation for Chinese patent publication No. CN 105323048 A, published Feb. 10, 2016, 26 pages, translated by Google at https://patents.google.com.

English translation for Chinese patent publication No. CN 105743624 A, published Jul. 6, 2016, 38 pages, translated by Google at https://patents.google.com.

English translation for Chinese patent publication No. CN 105991266 A, published Oct. 5, 2016, 29 pages, translated by Google at https://patents.google.com.

English translation for Chinese patent publication No. CN 105991495 A, published Oct. 5, 2016, 21 pages, translated by Google at https://patents.google.com.

English translation for Chinese patent publication No. CN 105991498 A, published Oct. 5, 2016, 56 pages, translated by Google at https://patents.google.com.

English translation for Chinese patent publication No. CN 105991500 A, published Oct. 5, 2016, 40 pages, translated by Google at https://patents.google.com.

English translation for Chinese patent publication No. CN 105991501 A, published Oct. 5, 2016, 44 pages, translated by Google at https://patents.google.com.

English translation for Chinese patent publication No. CN 105991502 A, published Oct. 5, 2016, 25 pages, translated by Google at https://patents.google.com.

English-language abstract for Chinese patent publication No. CN 105007145 A, published Oct. 28, 2015, 1 page, from https://worldwide.espacenet.com.

English-language abstract for Chinese patent publication No. CN 105007146 A, published Oct. 28, 2015, 1 page, from https://worldwide.espacenet.com.

English-language abstract for Chinese patent publication No. CN 105024791 A, published Nov. 4, 2015, 1 page, from https://worldwide.espacenet.com.

English-language abstract for Chinese patent publication No. CN 105024952 A, published Nov. 4, 2015, 2 pages, from https://worldwide.espacenet.com.

(56) References Cited

OTHER PUBLICATIONS

English-language abstract for Chinese patent publication No. CN 105024963 A, published Nov. 4, 2015, 1 page, from https://worldwide.espacenet.com.
English-language abstract for Chinese patent publication No. CN 105245479 A, published Jan. 13, 2016, 1 page, from https://worldwide.espacenet.com.
English-language abstract for Chinese patent publication No. CN 105282076 A, published Jan. 27, 2016, 2 pages, from https://worldwide.espacenet.com.
English-language abstract for Chinese patent publication No. CN 105282078 A, published Jan. 27, 2016, 1 page, from https://worldwide.espacenet.com.
English-language abstract for Chinese patent publication No. CN 105323048 A, published Feb. 10, 2016, 1 page, from https://worldwide.espacenet.com.
English-language abstract for Chinese patent publication No. CN 105743624 A, published Jul. 6, 2016, 2 pages, from https://worldwide.espacenet.com.
International Search Report and Written Opinion; International Application No. PCT/US2015/44290; dated Oct. 26, 2015.
U.S. Appl. No. 15/809,832, entitled "Dynamic Configuration of a Flexible Orthogonal Frequency Division Multiplexing PHY Transport Data Frame", by Michael J. Simon, Kevin A Shelby, and Mark Earnshaw, filed Nov. 10, 2017, 78 pages.
"Digital Video Broadcasting (DVB)" ETSI EN 302 755 v1.3.1; Apr. 2012; pp. 1-188; European Telecommunications Standards Institute (ETSI), France (188 pages).
English translation for Japanese patent publication No. JP 2013-102466 A, published May 23, 2013, 13 pages, translated by Google at https://patents.google.com.
English translation for Japanese patent publication No. JP 2013-219778 A, published Oct. 24, 2013, 25 pages, translated by Google at https://patents.google.com.
English translation for Japanese patent publication No. JP 2013-510467 A, published May 23, 2013, 11 pages, translated by Google at https://patents.google.com.
Chu, C.W. et al., "Design of an OFDMA Baseband Receiver for 3GPP Long-Term Evolution," IEEE International Symposium on VLSI Design, Automation and Test, Piscataway, NJ, USA, pp. 196-199 (Apr. 23, 2008).
Earnshaw, M. et al., "Physical Layer Framing for ATSC 10," IEEE Transactions on Broadcasting, vol. 62, No. 1, Piscataway, NJ, USA, pp. 263-270 (Mar. 1, 2016).
DVB Organization: "TM-NGH496_Doppler_2.pptx", DVB, Digital Video Broadcasting, C/0 EBU-17A ANCIENNE Route—CH-1218 Grand Saconnex, Geneva—Switzerland, Oct. 25, 2010 (Oct. 25, 2010), XP017832536.
"Digital Video Broadcasting (DVB); Implementation guidelines for a second generation digital terrestrial television broadcasting system (DVBT2)", Technical Specification, European Telecommunications Standards Institute (ETSI), 650, Route Des Lucioles ; F-06921 Sophia-Antipolis; France, vol. Broadcas, No. V1.1.1, Oct. 1, 2010 (Oct. 1, 2010), XP014061392.
"A flexible approach for 802.16m compatibility with legacy 802.16 systems; C80216m-08_1159r1", IEEE Draft; C80216M-08_1159R1, IEEE-SA, Piscataway, NJ , USA, vol. 802.16m, Sep. 5, 2008 (Sep. 5, 2008), pp. 1-8, XP017611088, [retrieved on Sep. 17, 2008].
"Flexible OFDM parameters for better performance; C80216m-08_1158", IEEE Draft; C80216M-08_1158, IEEE-SA, Piscataway, NJ USA, vol. 802.16m, Sep. 5, 2008 (Sep. 5, 2008), pp. 1-7, XP017610974, [retrieved on Sep. 6, 2008].
Extended European Search Report, dated Jun. 6, 2018, for European Patent Appl. No. 15829279.7, 17 pages.
English Translation of First Official Action, dated Apr. 17, 2018, for Chinese Patent Appl. No. 201580050598.8, 3 pages.
English translation for Chinese patent publication No. CN 101208887 A, published Jun. 25, 2008, 14 pages, translated by Google at https://patents.google.com.
English translation for Chinese patent publication No. CN 101459491 A, published Jun. 17, 2009, 7 pages, translated by Google at https://patents.google.com.
First Office Action, dated Oct. 11, 2019, for Chinese Application No. 201580031556.X (English Translation Included), 22 pages.

* cited by examiner

| $N_{FFT}$ | Cyclic Prefix Length | | | | | | | | | | | | | |
|---|---|---|---|---|---|---|---|---|---|---|---|---|---|---|
| | 1.56% | | 2.34% | | 3.13% | | 4.69% | | 6.25% | | 9.38% | | 12.5% | |
| | # Samples | Range (km) | # Samples | Range (km) | # Samples | Range (km) | # Samples | Range (km) | # Samples | Range (km) | # Samples | Range (km) | # Samples | Range (km) |
| 1024 | 16 | 0.4 | 24 | 0.6 | 32 | 0.8 | 48 | 1.2 | 64 | 1.6 | 96 | 2.3 | 128 | 3.1 |
| 2048 | 32 | 0.8 | 48 | 1.2 | 64 | 1.6 | 96 | 2.3 | 128 | 3.1 | 192 | 4.7 | 256 | 6.3 |
| 4096 | 64 | 1.6 | 96 | 2.3 | 128 | 3.1 | 192 | 4.7 | 256 | 6.3 | 384 | 9.4 | 512 | 12.5 |
| 8192 | 128 | 3.1 | 192 | 4.7 | 256 | 6.3 | 384 | 9.4 | 512 | 12.5 | 768 | 18.8 | 1024 | 25.0 |
| 16384 | 256 | 6.3 | 384 | 9.4 | 512 | 12.5 | 768 | 18.8 | 1024 | 25.0 | 1536 | 37.5 | 2048 | 50.0 |
| 32768 | 512 | 12.5 | 768 | 18.8 | 1024 | 25.0 | 1536 | 37.5 | 2048 | 50.0 | 3072 | 75.0 | 4096 | 100.0 |
| 65536 | 1024 | 25.0 | 1536 | 37.5 | 2048 | 50.0 | 3072 | 75.0 | 4096 | 100.0 | 6144 | 150.0 | 8192 | 200.0 |

*FIG. 1C*
*(Table 3)*

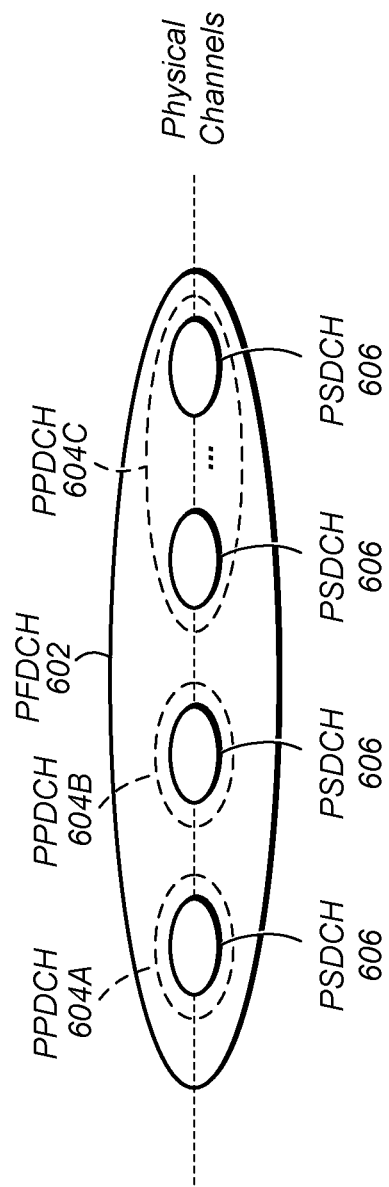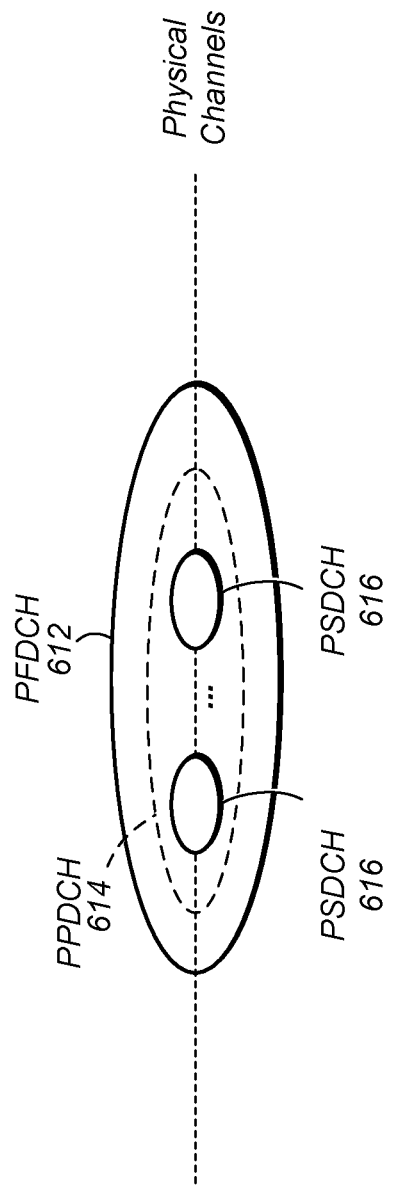
FIG. 6
FIG. 7

Receive or generate a payload region for a frame of wireless data, wherein the payload region includes a plurality of partitions that each include multiple orthogonal frequency-division multiplexing (OFDM) symbols, wherein different ones of the partitions have different frequency transform sizes for the OFDM symbols in the ones of the partitions
1710

Broadcast the frame of wireless data including the payload region
1720

FIG. 17

MULTI-PORTION RADIO TRANSMISSIONS

This application is a continuation of U.S. patent application Ser. No. 15/247,198, filed on Aug. 25, 2016, which is a continuation of U.S. patent application Ser. No. 14/805,004, filed on Jul. 21, 2015, now U.S. Pat. No. 9,438,459 issued on Sep. 6, 2016, which claims the benefit of U.S. Provisional Application No. 62/034,626, filed on Aug. 7, 2014; the disclosures of all of which are incorporated by reference herein in their respective entireties.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE DISCLOSURE

The present disclosure relates to the field of wireless communication, and more particularly, to mechanisms for dynamically constructing OFDM physical transport frames, to enable flexibility in configuration of transmissions in broadcast networks.

DESCRIPTION OF THE RELATED ART

In today's world, many electronic devices rely upon wireless connectivity for the reception of data from other connected devices. In a typical wireless deployment, there may be one or more wireless access points that transmit data, and one or more devices that receive data from the wireless access point(s).

In such a scenario, different devices may have different propagation channel characteristics, and these may affect their wireless data reception from the same wireless access point. For example, a device that is near the wireless access point and/or that has a fixed location (or is slowly moving) may have better propagation channel conditions than would a device that is moving at a high velocity and/or that is further away from the wireless access point. The first device may fall into a group of devices able to receive data encoded and transmitted with one set of parameters (such as a high Forward Error Correction (FEC) code rate, a high modulation level, and/or a smaller subcarrier spacing in an Orthogonal Frequency Division Multiplexing (OFDM) system), while the second device may fall into a group of devices that need data to be encoded and transmitted with a second set of parameters (such as a low FEC code rate, a low modulation level, and/or a wider subcarrier spacing in an OFDM system).

There are many scenarios where a large number of devices may all wish to receive identical data from a common source. One such example is broadcast television, where a large number of television sets in various homes all receive a common broadcast signal conveying a program of interest. In such scenarios, it is significantly more efficient to broadcast or multicast the data to such devices rather than individually signaling the same data to each device. However, programs with different quality levels (e.g. high definition video, standard definition video, etc.) may need to be transmitted to different groups of devices with different propagation channel characteristics. In other scenarios, it may be desirable to transmit device-specific data to a particular device, and the parameters used to encode and transmit that data may depend upon the device's location and/or propagation channel conditions.

As described above, different sets of transmitted data may need to be transmitted with different encoding and transmission parameters, either simultaneously or in a time-multiplexed fashion (or both). The amount of data to be transmitted in a particular data set and/or the encoding and transmission parameters for that data set may vary with time.

At the same time, the demand for high-speed wireless data continues to increase, and it is desirable to make the most efficient use possible of the available wireless resources (such as a certain portion of the wireless spectrum) on a potentially time-varying basis.

SUMMARY

Modern and future high-speed wireless networks should be designed for efficient handling of a variety of deployment scenarios. The present patent discloses mechanisms that enable broad flexibility in wireless data delivery, to support services in a full range of deployment scenarios, which might include, but are not limited, to the following:
  receiver mobility (e.g. fixed, nomadic, mobile);
  cell size (e.g. macro, micro, pico);
  single or multiple frequency networks (SFN or MFN);
  multiplexing of different services; and/or
  bandwidth sharing.

In one set of embodiments, a method for receiving or generating a frame of wireless data may be implemented as follows.

In some embodiments, a computing device (e.g., corresponding to a base station or a broadcast gateway) receives or generates a payload region for a frame of wireless data. In some embodiments, the payload region includes a plurality of partitions that each include multiple orthogonal frequency-division multiplexing (OFDM) symbols. In some embodiments, different ones of the partitions have different frequency transform (e.g., Fast Fourier Transform (FFT)) sizes for the OFDM symbols in the ones of the partitions. These different frequency transform sizes may be adapted for decoding by mobile devices at different velocities (e.g., one partition may be adapted for mobile devices carried by pedestrians and another for mobile devices carried in vehicles). For example, smaller FFT sizes may be adapted for decoding by faster-moving devices. In various embodiments, any number of different partitions adapted for decoding by mobile devices in different velocity ranges may be included. Additional velocity ranges may include ranges corresponding to nomadic devices, ranges corresponding to aircraft, etc.

In some embodiments, different ones of the partitions may have different cyclic prefix sizes, which may be selected to maintain a desired cell size. Partitions with different cyclic prefix sizes may be adapted for receiving devices having different expected delay spreads, for example.

In some embodiments, the computing device broadcasts the frame of wireless data, including the payload region. In other embodiments (e.g., when the computing device is a gateway), the device may transmit the payload region to a base station which may then broadcast the frame of wireless data.

In some embodiments, the operations also include generating partition data for the frame of wireless data that indicates the FFT size and/or the cyclic prefix size for each of the partitions.

In some embodiments, each of the partitions includes a corresponding set of overhead resource elements (such as reference symbols). In these embodiments, the operations may also include scheduling symbol data from one or more service data streams to each of the partitions after having reserved the overhead resource elements within the frame.

In some embodiments, the frame may be partitioned according to one or more other factors in addition to (or, as an alternative to) the above-described partitioning according to the expected user mobility and desired cell coverage as determined by FFT size and cyclic prefix size, e.g., factors such as:

- data rate, wherein different partitions have different data rates, e.g., high data rate vs. low data rate (along the lines of Internet of Things), with a lower duty cycle for low power reception;
- tight vs. loose clustering of transport blocks (e.g., Physical Service Data Channels (PSDCHs)) within each partition where time diversity may be sacrificed in the interest of allowing a low power device to wake up, consume the data it needs, and then go back to sleep;
- frequency partitioning, which may allow band edges to be coded more robustly using a lower modulation order to permit band shaping or other interference mitigation techniques; and/or
- broadcast content, such as local v. regional programming, which may be broadcast using different partitions.

BRIEF DESCRIPTION OF THE DRAWINGS

A better understanding of the disclosed embodiments may be obtained when the following detailed description is considered in conjunction with the following drawings.

FIG. 1C is a table showing the cyclic prefix lengths (in number of samples) and corresponding ranges (in km) for various example cyclic prefix lengths specified relative to (as a percentage of) the useful portion of each OFDM symbol.

FIG. 6 illustrates a special case where two PPDCHs each include only one PSDCH.

FIG. 7 illustrates a special case where a PFDCH includes only one PPDCH.

FIG. 17 illustrates one embodiment of a method for receiving or generating a payload region for a frame of wireless data, according to some embodiments.

Figure 1A:
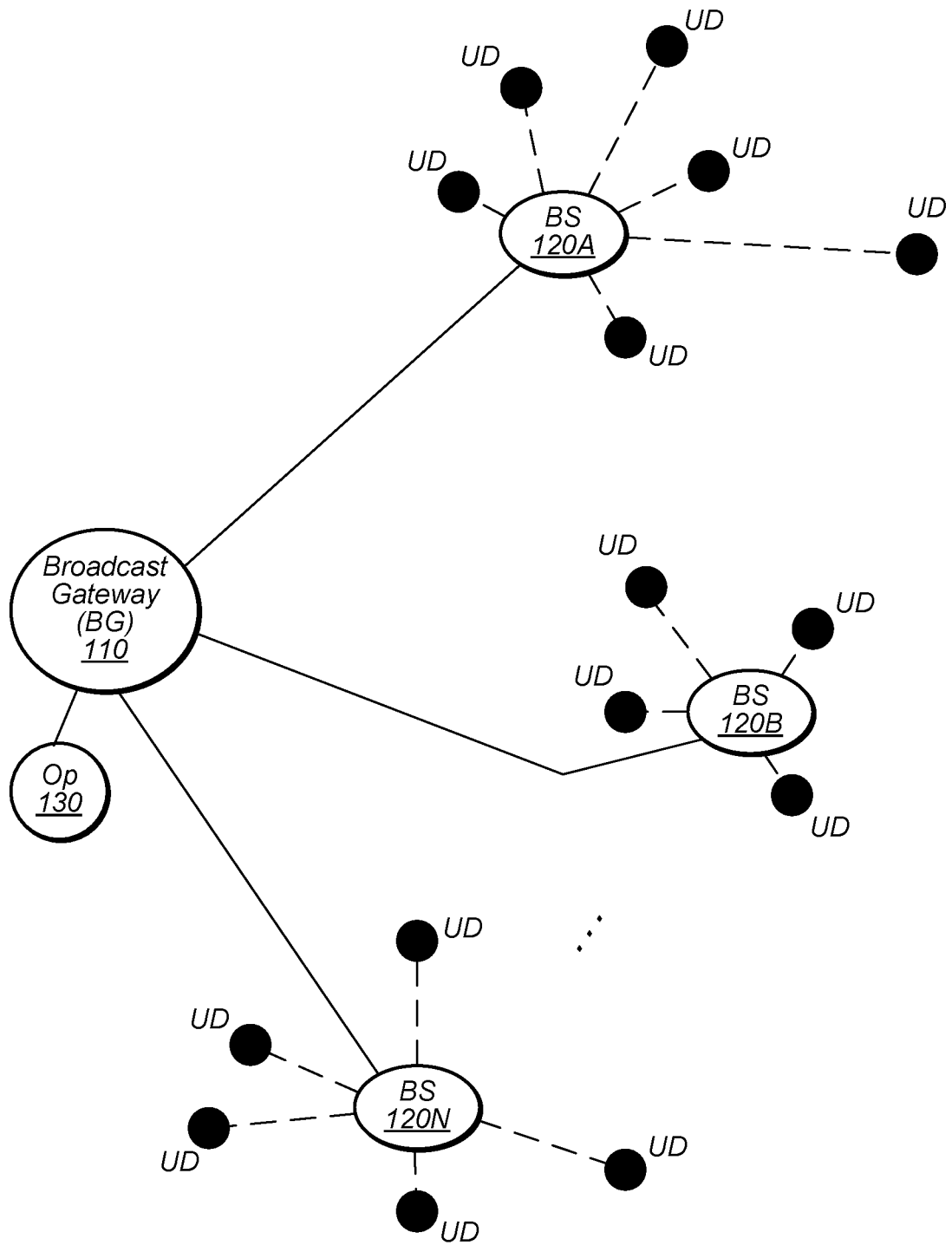
FIG. 1A illustrates one embodiment of a broadcast network including a plurality of base stations.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

List of Potentially Relevant Acronyms
ATS: Auxiliary Termination Symbols
BG: Broadcast Gateway
BS: Base Station
CP: Cyclic Prefix
CRC: Cyclic Redundancy Check
DC: Direct Current
FEC: Forward Error Correction
FFT: Fast Fourier Transform
IFFT: Inverse Fast Fourier Transform
LDPC: Low Density Parity Check
MAC: Medium Access Control
NIFN: Multi-Frequency Network
MHz: Mega Hertz
OFDM: Orthogonal Frequency Division Multiplexing
PDU: Protocol Data Unit
PHY PHYsical layer
PFDCH: Physical Frame Data CHannel
PPDCH: Physical Partition Data CHannel
PSDCH: Physical Service Data CHannel
QAM: Quadrature Amplitude Modulation
RS: Reference Symbols
SFN: Single Frequency Network Broadcast Network Architecture In some embodiments, a broadcast network may be configured as shown in FIG. 1A. In the illustrated embodiment, the broadcast network includes a broadcast gateway (BG) 110 coupled to a plurality of base stations 120A-N and an operator system (Op) 130. Broadcast gateway 110 may couple to the base stations through any of a variety of communication media. For example, in one embodiment, the broadcast gateway may couple to the base stations via the Internet, or more generally, via a computer network. Each base station 120 is configured to wirelessly transmit information to one or more user devices. (Each user device (UD) is denoted by a solid block circle, in the illustrated embodiment.) Some of the user devices may be fixed devices such as televisions and desktop computers. Other ones of the user devices may be nomadic devices such as tablet computers or laptop computers. Other ones of the user devices may be mobile devices such as mobile phones, automobile-based devices, aircraft-based devices, etc.

An operator of the broadcast network may access the broadcast gateway (e.g., via the Internet), and provide network configuration or operating information to the gateway. This information may include:
- an expected distribution of user device mobility for one or more of the base stations;
- the cell size of one or more of the base stations;
- a selection of whether the broadcast network or a subset of the network is to be operated as a single frequency network (SFN) or a multi-frequency network (MFN);
- a specification of how different services (e.g., television content streams) are to be assigned to different types of user devices;
- identification of portions of bandwidth the broadcast network will not be using over corresponding periods of time.

The broadcast gateway 110 may determine transmission control information for one or more base stations 120 of the broadcast network based on the network configuration or operating instructions. For a given base station, the broadcast gateway may determine the following attributes for frames of wireless data to be broadcast: number of partitions, sizes of the partitions, FFT size for each partition, and/or cyclic prefix size for each partition. The broadcast gateway may send the transmission control information to the base stations so the base stations may construct and transmit frames according to the transmission control information. In other embodiments, the gateway may itself generate frames to be transmitted by each gateway and send the frames to the base stations. In yet other embodiments, the gateway may generate low level instructions (e.g., physical layer instructions) for the construction of frames to the base stations, and send those instructions to the base stations, which may simply generate frames based on the instructions.

OFDM Symbols and FFT/IFFT Sizes

Orthogonal Frequency Division Multiplexing (OFDM) systems typically use an Inverse Fast Fourier Transform (IFFT) operation at the transmitter to convert frequency domain data to the time domain for transmission, and a Fast Fourier Transform (FFT) operation at the receiver to convert received time domain values back to the frequency domain in order to recover the originally transmitted data. In the following text, the term FFT is generally used, but the parameters described correspond to the frequency and time dimensions for both the FFT and IFFT operations. Thus, the term "FFT size" may refer to the size of either an IFFT or an FFT.

For illustration purposes, an example base sampling rate of Fs=12.288 MHz is generally used herein. This is not intended to be limiting, and other sampling rates may also be used in various embodiments or situations. The corresponding base time unit corresponding to one sample at a given sampling rate is Ts=1/Fs seconds.

In some embodiments, a range of different FFT/IFFT sizes and cyclic prefix lengths are supported in order to address a wide variety of propagation conditions and different end user scenarios. A separate entity such as a scheduler may select appropriate FFT/IFFT size(s) and cyclic prefix length(s) for each frame based on the following considerations.

First, determine the minimum subcarrier spacing needed to support the intended user mobility. Higher mobile velocities generally result in larger Doppler shifts, which necessitate wider subcarrier spacing in frequency, $\Delta f$. The subcarrier spacing may be calculated as follows. Thus, larger FFT sizes are better adapted for decoding for fixed receiving devices and smaller FFT sizes are better adapted for decoding for mobile receiving devices, in various embodiments.

$$\Delta f = \frac{F_S}{FFT \text{ size}}$$

Figure 1B:
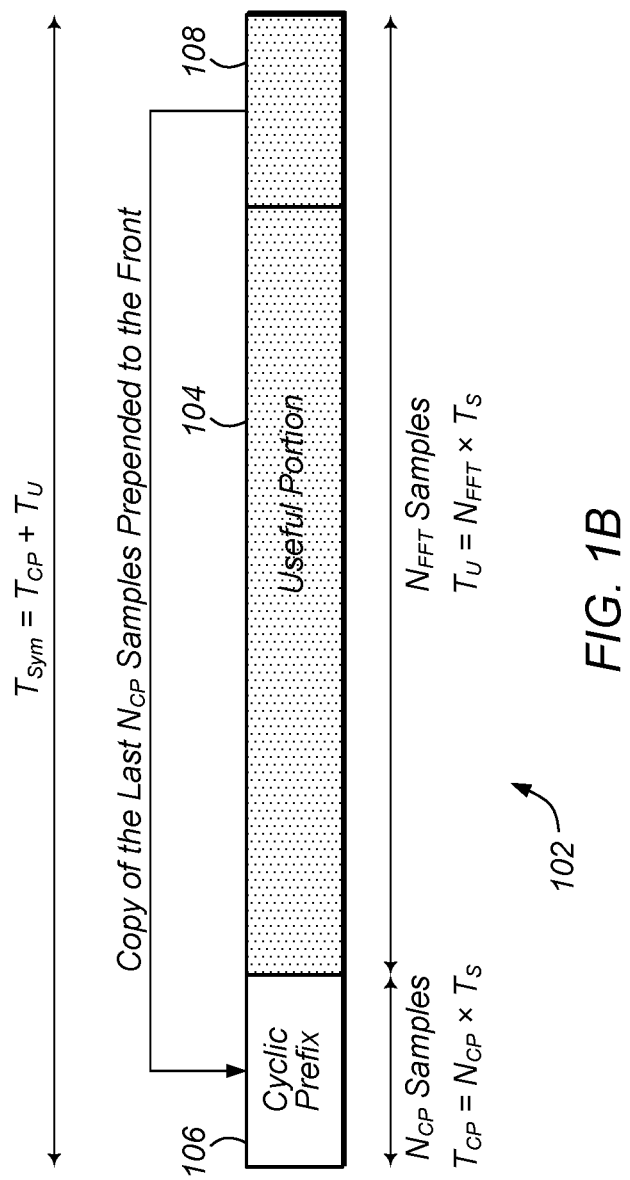
FIG. 1B illustrates one embodiment of an Orthogonal Frequency Division Multiplexing (OFDM) symbol with both a cyclic prefix and a useful portion.

As shown in the illustrated embodiment of FIG. 1B, each OFDM symbol with a total time length of $T_{Sym}$ consists of two parts, a cyclic prefix with a time length of $T_{CP}$, and a useful portion with a time length of $T_U$. The useful portion 104 of the OFDM symbol 102 refers to the amount of data corresponding to the IFFT/FFT operations. The cyclic prefix 106 is a copy of the last $N_{CP}$ samples 108 of the useful portion of the OFDM symbol, and thus essentially represents overhead which is included in the OFDM symbol 102.

The useful portion of an OFDM symbol has a number of time samples equal to the size of the FFT ($N_{FFT}$), and a time length equal to:

$$T_U = FFT \text{ size} \times T_S = \frac{1}{\Delta f}$$

The cyclic prefix contains a specified number of samples ($N_{CP}$) with a corresponding time length of $T_{CP}$. The cyclic prefix consists of sample values copied from the useful portion (e.g., from the end) of the same OFDM symbol and provides protection against inter-symbol interference between successive OFDM symbols.

The number of subcarriers actually used within an FFT/IFFT may depend on both the subcarrier spacing (a function of the FFT size and the sampling frequency) and the bandwidth of the system, since the bandwidth occupied by the used subcarriers should be less than the system bandwidth (e.g., in order to allow for a guard band between adjacent channels). Note also that the direct current (DC) carrier is typically not used.

Table 1 shows a list of exemplary FFT sizes. FFT sizes that are an integer power of 2 may be preferred in a wireless implementation for simplification reasons, although non-power-of-2 sizes may be used in some embodiments. The time length ($T_U$) corresponding to the usable portion of each OFDM symbol, the subcarrier spacing ($\Delta f$), and the maximum Doppler velocity that can typically be handled at an example carrier frequency of 700 MHz are also shown. Here, the maximum Doppler velocity is defined as the receiver velocity which results in a Doppler frequency shift equal to 10% of the subcarrier spacing. (It should be understood that the 10% used here is not essential to the presently disclosed inventions. Indeed, the percentage may take any value in a range of values.) The values in this table are based on the assumed example sampling frequency of 12.288 MHz. Thus, signals adapted for decoding by mobile devices at up to a particular maximum velocity may actually be decodable at higher velocities, in some situations, depending on wireless propagation conditions, etc.

TABLE 1

Example FFT sizes, useful portion time lengths,
subcarrier spacings, and maximum Doppler velocities
for an example sampling rate of 12.288 MHz:

| FFT Size ($N_{FFT}$) | $T_U$ (μs) | Δf (Hz) | Maximum Doppler velocity at 700 MHz (km/h) |
|---|---|---|---|
| 1024 | 83 | 12000 | 1851 |
| 2048 | 167 | 6000 | 926 |
| 4096 | 333 | 3000 | 463 |
| 8192 | 667 | 1500 | 231 |
| 16384 | 1333 | 750 | 116 |
| 32768 | 2667 | 375 | 58 |
| 65536 | 5333 | 188 | 29 |

Table 2 shows similar information for a different example sampling rate of 18.432 MHz. As can be seen, for a given FFT size, a sampling rate of 18.432 MHz results in a shorter OFDM symbol length ($T_U$), a wider subcarrier spacing (Δf), and a higher maximum Doppler velocity which can be handled, as compared to a sampling rate of 12.288 MHz.

TABLE 2

Example FFT sizes, useful portion time lengths,
subcarrier spacings, and maximum Doppler velocities
for an example sampling rate of 18.432 MHz

| FFT Size ($N_{FFT}$) | $T_U$ (μs) | Δf (Hz) | Maximum Doppler velocity at 700 MHz (km/h) |
|---|---|---|---|
| 1024 | 56 | 18000 | 2777 |
| 2048 | 111 | 9000 | 1389 |
| 4096 | 222 | 4500 | 694 |
| 8192 | 444 | 2250 | 347 |
| 16384 | 889 | 1125 | 174 |
| 32768 | 1778 | 563 | 87 |
| 65536 | 3556 | 281 | 43 |

Cyclic Prefix Lengths and Cyclic Prefix Length Selection

The cyclic prefix (CP) length for a given partition may be selected to meet an intended range requirement. The cyclic prefix is typically used to address inter-symbol interference between successive OFDM symbols. Such inter-symbol interference may arise from copies of the transmitted signal with slightly different time delays arriving at the receiver, with such copies resulting from identical signal transmissions from multiple base stations in a Single Frequency Network (SFN) and/or reflections of a transmitted signal in a multi-path propagation environment. Consequently, in an SFN with significant distances between neighboring base stations (or, potentially, in a propagation environment with significant multi-path scatter), a larger CP length would be selected. Conversely, in an SFN where neighboring base stations are closer together, a shorter CP length may be used.

The CP length may be viewed as a percentage of the overall OFDM symbol length (giving the percent overhead consumed by the CP). However, for range planning, it may be more useful to view the CP length as measured in samples (as defined by the sampling frequency). For example, radio signals will propagate approximately 24.4 meters in the time of one sample for the example sampling frequency of 12.288 MHz.

Table 3 (shown in FIG. 1C) gives cyclic prefix lengths (in number of samples) and corresponding ranges (in km) for various example cyclic prefix lengths specified relative to (as a percentage of) the useful portion of each OFDM symbol. Again, the values in the table are based on the example sampling frequency of 12.288 MHz.

The above cyclic prefix lengths should be considered to be illustrative examples only. In particular, cyclic prefix lengths should not necessarily be considered to be restricted to be a power of two (or even a multiple of a power of two). Cyclic prefix lengths may have any positive integer value.

Payload Data Terminology

Figure 2:
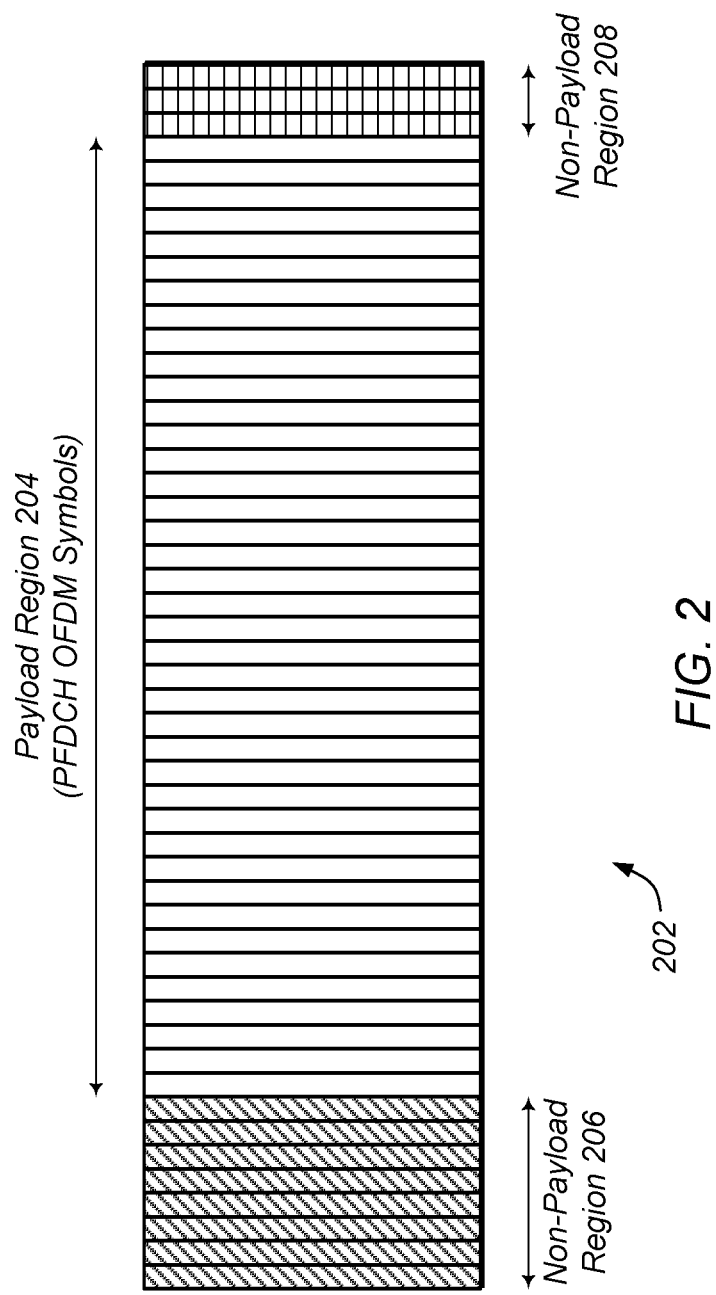
FIG. 2 illustrates an overview of a possible frame structure.

In a wireless system, data may generally be transmitted in a series of frames, which correspond to a certain period of time. FIG. 2 shows a general overview of an exemplary frame structure. The frame 202 includes a payload region 204 which carries actual payload data and zero or more non-payload regions 206 and 208 which may carry control information or other signaling information. In the example of FIG. 2, separate non-payload regions 206 and 208 are shown by the shaded areas at the beginning and end of the frame 202. The relative lengths in time (horizontal axis) and numbers of symbols for each region may or may not be shown to scale in this example diagram.

The payload section of the frame may be referred to as the Physical Frame Data CHannel (PFDCH) and carries the actual payload data (as opposed to control or other signaling data) being transmitted by a base station. In the illustrated embodiment, each frame has a time length of 1 second. In some embodiments, the payload region (PFDCH) has a time length of 990 ms. In other embodiments, however, payload regions and frames may have any of various appropriate time lengths.

An OFDM wireless frame (at least the payload portion of it, the PFDCH) is divided into OFDM symbols in the time dimension and sub-carriers in the frequency dimension. The most basic (time-frequency) unit of data carrying capability in OFDM is a resource element, which is defined as one sub-carrier in the frequency dimension by one OFDM symbol in the time dimension. Each resource element may carry one QAM modulation symbol (or QAM constellation).

The number of sub-carriers available for a fixed system bandwidth may depend on the subcarrier spacing, which is in turn dependent upon the selected FFT size and sampling frequency. The time length of an OFDM symbol may be dependent upon the selected FFT size and also upon the selected cyclic prefix length and sampling frequency. The number of OFDM symbols available within a fixed period of time (such as the length of a frame) may be dependent upon the time lengths of the individual OFDM symbols contained within that period of time.

The PFDCH may be divided into one or multiple partitions or PPDCHs (Physical Partition Data CHannel). A PPDCH is a rectangular logical area measuring some number of sub-carriers in the frequency dimension and some number of OFDM symbols within the time dimension. A PPDCH need not span the full frequency bandwidth of the system, or the full time length of the PFDCH. This allows multiple PPDCHs to be multiplexed in time and/or frequency within the same PFDCH, in some embodiments.

Different PPDCHs may have, but are not constrained to have, different FFT sizes and/or different cyclic prefix lengths. Dividing a PFDCH into multiple PPDCHs may support the provision of services to different categories of receiving devices. For example, fixed devices may be served program data via a PPDCH with a large FFT size and closer subcarrier spacing, while mobile devices may be served program data via a different PPDCH with a smaller FFT size and wider subcarrier spacing.

Figure 3:
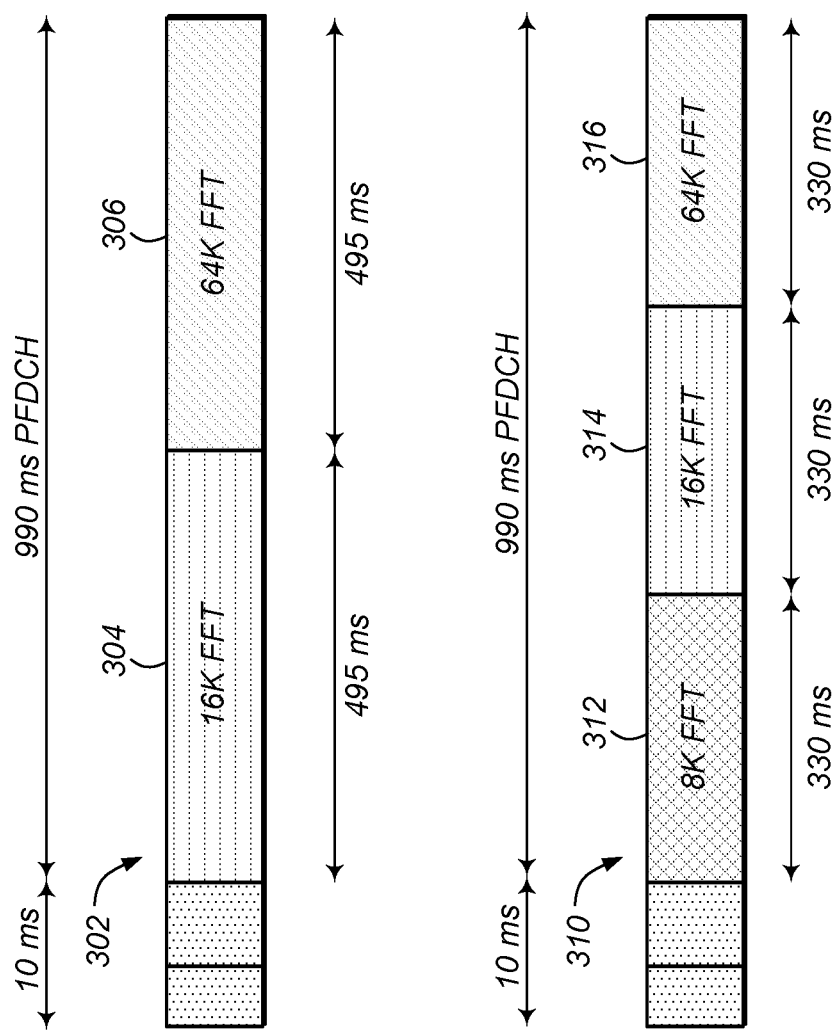
FIG. 3 illustrates two examples of Physical Partition Data CHannel (PPDCH) time multiplexing with distinct time separation of the PPDCHs.

FIG. 3 shows two examples of partitioned PFDCHs 302 and 310. These example configurations use the previously stated example frame length of 1 second and PFDCH length of 990 ms, which leave a 10 ms non-payload region at the beginning of each example frame. In the first example, two PPDCHs 304 and 306 use different FFT sizes and may be adapted to serve nomadic and fixed users, respectively. In the second example, three PPDCHs 312, 314 and 316 use different FFT sizes and may be adapted to serve mobile, nomadic, and fixed users, respectively. The same cyclic prefix length as measured in samples may be used for all of the PPDCHs if the desired transmit ranges for different categories of users are desired to be the same. However, there is no constraint requiring the same cyclic prefix length to be used across multiple PPDCHs, so the configured cyclic prefix length may vary from one PPDCH to another, and the use of different cyclic prefix lengths for different PPDCHs may in fact be desirable for certain wireless provisioning scenarios.

For example, in some embodiments, different partitions in a payload are used to carry different types of content. In some embodiments, a partition with local content is configured with a smaller prefix size than a partition with regional content. This may allow the regional content to be decodable by receiving devices in a greater area, while restricting the local content to nearby devices. In some embodiments, different base stations may be configured to transmit local content and regional content. For example, multiple local base stations may cover a similar area to a single regional base station. In these embodiments, the base stations may be configured to blank transmissions during one or more pre-arranged partitions. For example, for a partition used by the local base stations to transmit local content, the regional base station may refrain from transmitting using time and/or frequency resources assigned to that partition. Similarly for a partition used by the regional base station to transmit regional content, the local base stations may refrain from transmitting using time and/or frequency resources assigned to that partition.

Figure 4:
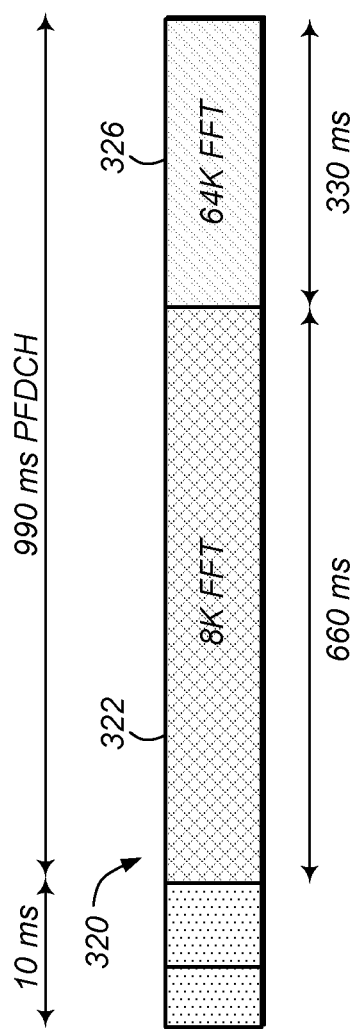
FIG. 4 shows an exemplary frame whose Physical Frame Data CHannel (PFDCH) includes: a first partition 322 of length 660 ms and 8K FFT size; and a second partition 326 of length 330 ms and 64K FFT size.

Although the PPDCHs in FIG. 3 are the same size, there is no requirement for PPDCHs within the same frame to be of the same length. Indeed, since different modulation levels and code rates may often be used within different PPDCHs, the data carrying capacities of different PPDCHs may also be very different. FIG. 4 shows a frame whose PFDCH 320 includes: a first partition 322 of length 660 ms and 8K FFT size; and a second partition 326 of length 330 ms and 64K FFT size.

Each PPDCH within a frame may contain zero or more Physical Service Data CHannels (PSDCH). (Note also that part or all of the physical resources within a PPDCH may be left unused.) The contents of a PSDCH are encoded and transmitted using a specified set of physical resources within the corresponding PPDCH, in some embodiments. Each PSDCH corresponds to one transport block for data carrying purposes, in some embodiments. A transport block may correspond to a Medium Access Control (MAC) Protocol Data Unit (PDU) and represent a set of data bytes from upper layers to be transmitted.

Figure 5:
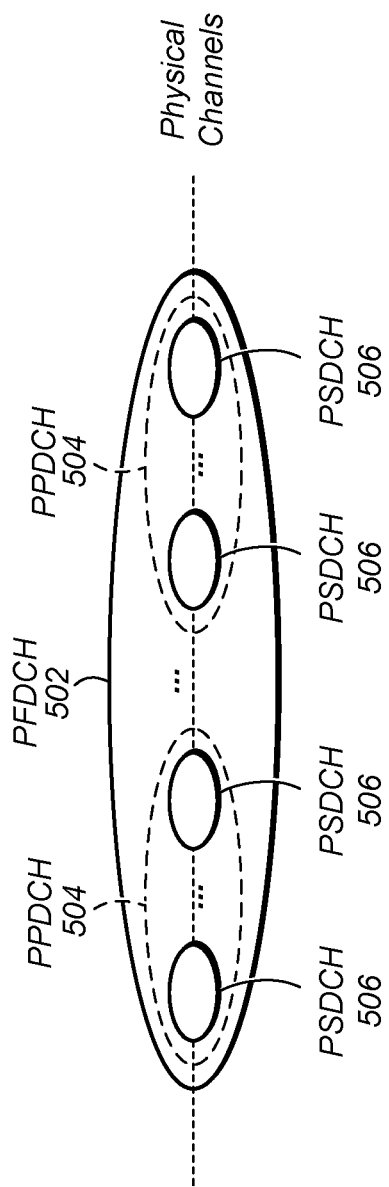
FIG. 5 illustrates the relationship between different physical channels for carrying payload data, according to some embodiments.

The relationship between the various payload-related physical channels, according to some embodiments, is illustrated in FIG. 5. In the illustrated embodiment, each frame contains one Physical Frame Data CHannel (PFDCH) 502. The PFDCH 502 contains one or more Physical Partition Data CHannels (PPDCH) 504. Each PPDCH 504 contains zero or more Physical Service Data CHannels (PSDCH) 506.

There is no general constraint that a PPDCH include more than one PSDCH. FIG. 6 illustrates the case where two PPDCHs each include only one PSDCH. In particular, PPDCH 604A and PPDCH 604B in PFDCH 602 each include only one PSDCH, and PPDCH 604C includes a plurality of PSDCHs. (The PSDCHs in FIG. 6 are each labelled 606.) Furthermore, it is possible that the PFDCH may include only a single PPDCH, e.g., as shown in FIG. 7. In particular, PFDCH 612 includes the single PPDCH 614. PPDCH 614 includes one or more PSDCHs, each labeled 616.

Payload Structure and Mapping

This section provides detailed examples as to how the PFDCH of a wireless frame is structured, how payload partitions (PPDCHs, Physical Partition Data CHannels) are specified, how PSDCHs are mapped to specific physical resources, etc., in some embodiments. As such, the contents of this section may build on the concepts that were introduced earlier.

In some embodiments, the concept of mapping virtual resources to logical resources and then logical resources to physical resources is used to generate a payload.

Payload Partition Mapping

In a physical sense, the PFDCH consists of a number of consecutive samples in the time domain. This number of samples is equal to the total number of samples in one frame (e.g. 12.288 million samples for the example sampling frequency of 12.288 MHz and example frame length of 1 second) minus the lengths (in samples) of any non-payload regions in the frame.

In a logical sense, the PFDCH is composed of a number of OFDM symbols in the time domain and a number of subcarriers in the frequency domain. The sum of the lengths in samples of all OFDM symbols within the PFDCH should be less than or equal to the number of samples available for the PFDCH as calculated above.

In some embodiments, OFDM symbols belonging to the same PPDCH will have the same lengths, but OFDM symbols belonging to different PPDCHs may have different lengths. Consequently, not all OFDM symbols within the PFDCH will necessarily have the same length, in various embodiments.

Similarly, the number of subcarriers in the frequency domain is a function of the system bandwidth and the subcarrier spacing. The subcarrier spacing is dependent upon the selected FFT size and the sampling frequency, and may thus vary from one PPDCH to another, if distinct FFT sizes are configured for the two PPDCHs.

In various embodiments, different PPDCHs may be multiplexed in time and/or frequency. Thus, two given PPDCHs may share the same time slot and be frequency multiplexed, two given PPDCHs may share the same frequency resources and be time multiplexed, or both situations may occur for a given frame.

Each PPDCH may be referenced via an index (e.g. PPDCH #0, PPDCH #1, . . . ), which may facilitate assigning PSDCHs to specific PPDCHs.

The physical resources allocated to a PPDCH may be specified via the following sets of characteristics.
  (1) FFT size and cyclic prefix length (these characteristics determine the length of each OFDM symbol within the PPDCH, in some embodiments)
  (2) Physical resources allocated to the PPDCH in the time dimension.
  (3) Physical resources allocated to the PPDCH in the frequency dimension.

Specifying PPDCH Physical Resources in the Time Dimension

In the time dimension, a specific PPDCH may be defined using the following quantities:
 (a) Total number of OFDM symbols assigned to this PPDCH;
 (b) Absolute OFDM symbol starting position within the PFDCH for this PPDCH (indexing begins at 0, for the examples discussed herein);

As an illustrative example, consider the payload partitioning shown in FIG. 3 with corresponding example parameter settings shown in Table 4, where there are three equally-sized (in the time dimension) PPDCHs. As a result, the PFDCH contains a total of 440+232+60=732 OFDM symbols in this example.

PPDCH #0 contains OFDM symbols 0 through 439, each of length 9216 samples.

PPDCH #1 contains OFDM symbols 440 through 671, each of length 17408 samples.

PPDCH #2 contains OFDM symbols 672 through 731, each of length 66560 samples.

TABLE 4

Exemplary PPDCH parameters (time dimension) for FIG. 3

| Quantity | PPDCH #0 | PPDCH #1 | PPDCH #2 |
|---|---|---|---|
| PPDCH length (seconds) | 0.330 s | 0.330 s | 0.330 s |
| PPDCH length (samples) | 4,055,040 | 4,055,040 | 4,055,040 |
| FFT size | 8192 | 16384 | 65536 |
| CP length (samples) | 1024 | 1024 | 1024 |
| OFDM symbol length (samples) | 9216 | 17408 | 66560 |
| Total number of OFDM symbols | 440 | 232 | 60 |
| Absolute OFDM symbol starting position | 0 | 440 | 672 |

Specifying PPDCH Physical Resources in the Frequency Dimension

The subcarriers within each OFDM symbol may be divided into useful and non-useful subcarriers. Useful subcarriers lie within the system bandwidth minus a guard band, with the exception of the DC subcarrier which is considered a non-useful subcarrier. Non-useful subcarriers lie outside the system bandwidth minus the guard band.

The number of useful subcarriers may be a function of the FFT size and sampling frequency (which together determine the subcarrier spacing) and the system bandwidth.

Figure 8:
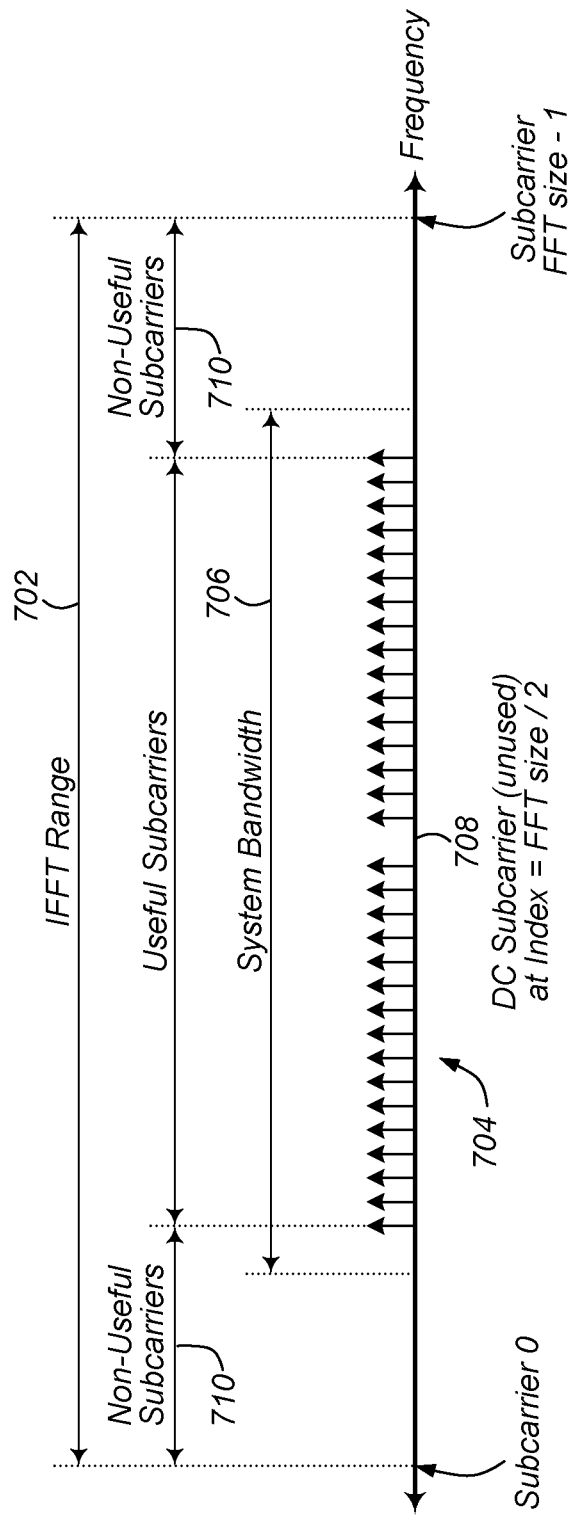
FIG. 8 illustrates useful subcarriers within an OFDM symbol, according to one embodiment.

Refer to FIG. 8 for additional details relating to useful and non-useful subcarriers, according to some embodiments. Within the full IFFT/FFT range (size) 702, the useful subcarriers 704 are those which lie within the system bandwidth 706 minus a guard band, with the exception of the DC subcarrier 708. Non-useful subcarriers 710 lie outside the system bandwidth minus the guard band.

There is no requirement that all useful subcarriers (resource elements) in an OFDM symbol be explicitly assigned to a PPDCH. Note that each useful resource element is assigned to a maximum of one PPDCH, in some embodiments. Any useful resource elements that are not associated with a PPDCH may be assigned a value of 0. Non-useful subcarriers (resource elements) may also be assigned a value of 0.

In the frequency dimension, a specific PPDCH may be defined via the following quantities: the number of useful subcarriers belonging to the PPDCH and the absolute index of the first subcarrier belonging to the PPDCH. The number of useful subcarriers is less than or equal to the total number of all useful subcarriers per OFDM symbol. This specifies the actual size of the PPDCH in the frequency dimension. The DC subcarrier is not considered to be a useful subcarrier, so if the DC subcarrier happens to lie within a particular PPDCH, then that subcarrier is not counted against the number of useful subcarriers belonging to that PPDCH, in some embodiments. Subcarriers may be indexed beginning at 0 and proceeding sequentially upwards to the total number of subcarriers minus 1 (e.g., the FFT size minus 1). Subcarrier 0 is therefore essentially the lowest frequency subcarrier.

Multiple PPDCHs may be multiplexed beside each other in the frequency dimension. In some embodiments, however, there is no actual interleaving of PPDCHs in the frequency dimension. In other embodiments, PPDCHs may be interleaved in the time and/or frequency dimension and thus may or may not be contiguous in either dimension. That is, in the frequency dimension, each PPDCH occupies a contiguous set of physical sub carriers.

Figure 9:
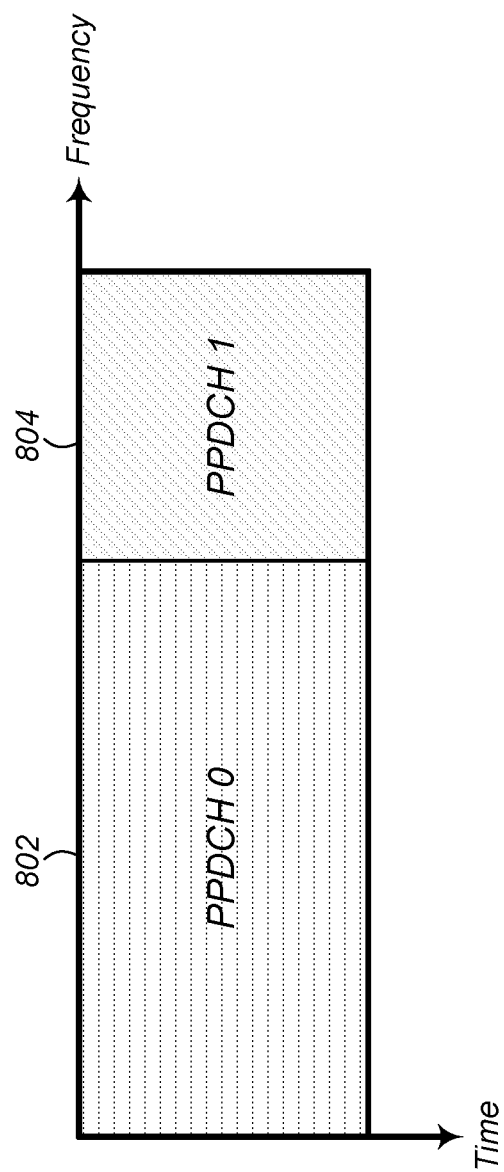
FIG. 9 illustrates an example of PPDCH frequency multiplexing, according to one embodiment.

FIG. 9 shows an example of two PPDCHs 802 and 804 that have been multiplexed beside each other in the frequency dimension. Approximately ⅔ of the useful subcarriers have been allocated to PPDCH #0 (802), with the remaining ⅓ of the useful subcarriers being allocated to PPDCH #1 (804). Table 5 contains the corresponding PPDCH parameters in the frequency dimensions for the two example PPDCHs 802 and 804 shown in FIG. 9. In this example, both PPDCHs have been configured to use the same FFT size and cyclic prefix length.

TABLE 5

Example PPDCH parameters (frequency dimension) for FIG. 9

| Quantity | PPDCH #0 | PPDCH #1 |
|---|---|---|
| FFT size | 16384 | 16384 |
| CP length (samples) | 1024 | 1024 |
| Subcarrier spacing | 750 Hz | 750 Hz |
| System bandwidth | 6 MHz | 6 MHz |
| Total number of all useful subcarriers | 7600 | 7600 |
| Number of useful subcarriers assigned to this PPDCH | 5000 | 2600 |
| Index of the first subcarrier belonging to this PPDCH | 4392 | 9393 |

PSDCH Mapping within a PPDCH

In some embodiments, PSDCHs are mapped to virtual resources within their assigned PPDCH, virtual resources are then mapped to logical resources within the same PPDCH, and then the logical resources of each PPDCH are mapped to actual physical resources within the PFDCH. This process is described in detail in the following sections.

Logical Resources for a PPDCH

Figure 10:
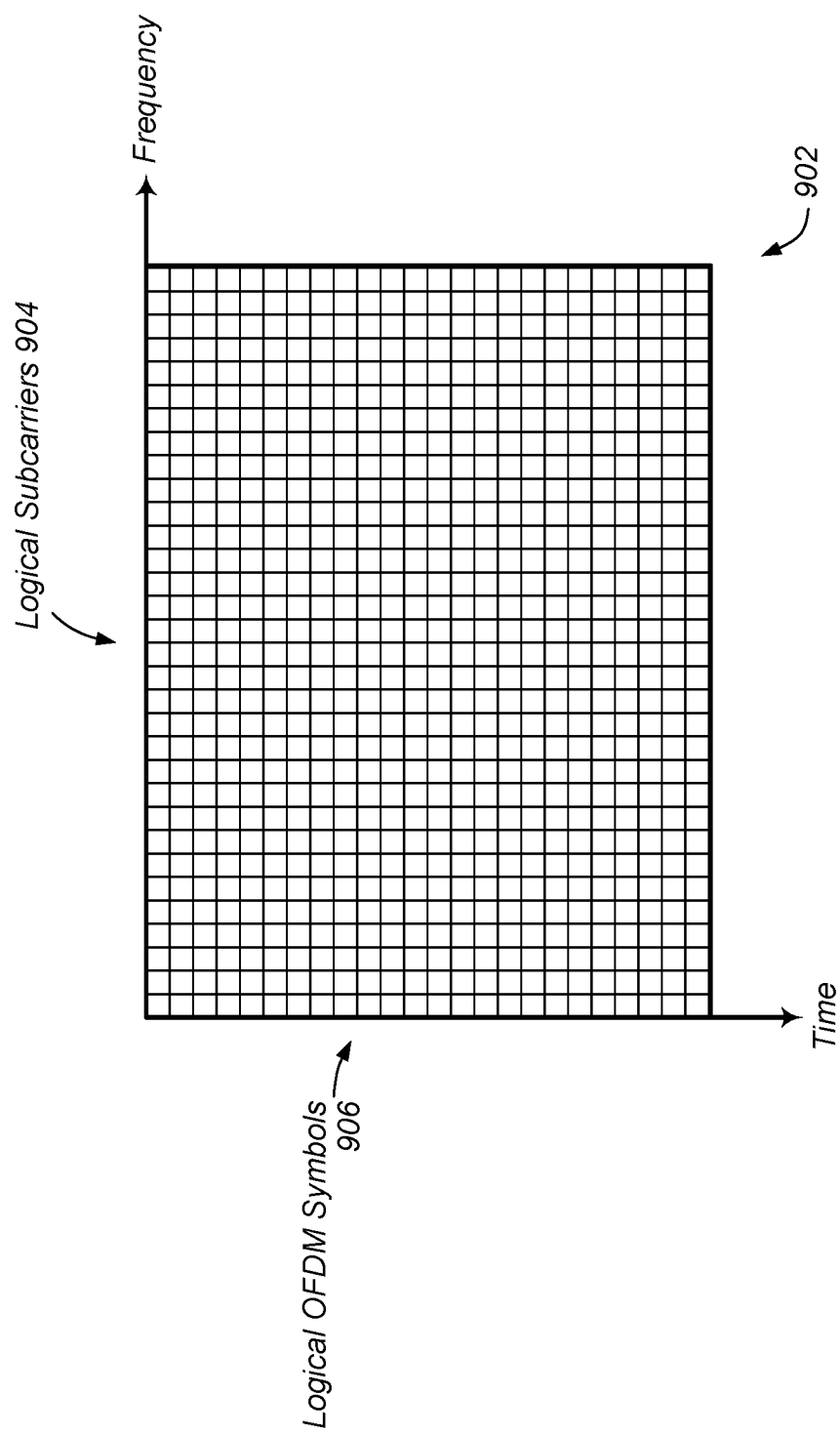
FIG. 10 illustrates the layout of logical resources within a PPDCH, according to one embodiment.

It has previously been described how a particular PPDCH is associated with corresponding physical resources. Regardless of the physical resources belonging to a PPDCH, the logical resources of a PPDCH may be considered to be contiguous in both the frequency and time dimensions, in some embodiments, as illustrated in FIG. 10. Here, the logical subcarriers 904 of a PPDCH 902 begin numbering at 0 at the left side of the diagram (lowest frequency) and progress sequentially upwards to the right. Similarly, the logical OFDM symbols 906 of the PPDCH 902 begin numbering at 0 at the top of the diagram (earliest time) and progress sequentially upwards moving forward through time (toward the bottom of the diagram).

Figure 11:
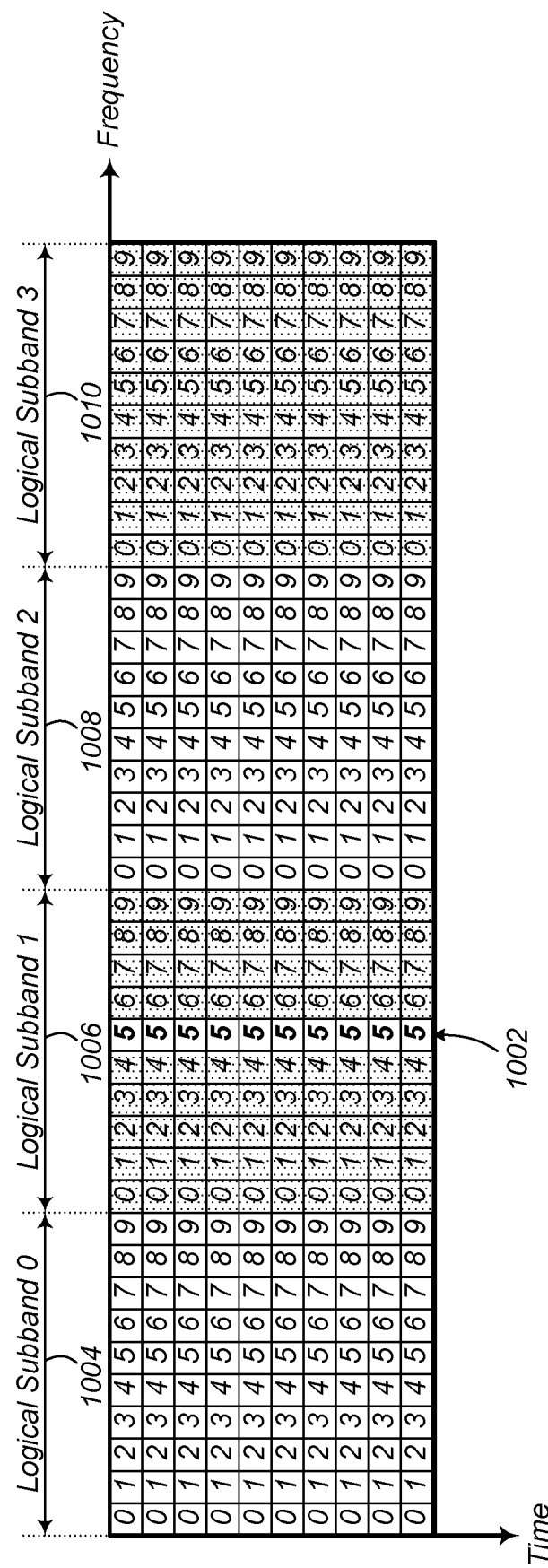
FIG. 11 illustrates logical stripes and logical subbands within a PPDCH, according to one embodiment.

FIG. 11 introduces additional logical resource concepts for the contents of a PPDCH. A stripe refers to a set of resources measuring one subcarrier in the frequency dimension and running for the full time duration of the PPDCH (i.e. all of the OFDM symbols) in the time dimension. Stripes may be grouped together in the frequency dimension into subbands, where the subband width of each subband in the frequency dimension is equal to the number of stripes specified for the PPDCH. Each logical subband is composed of a number of logical stripes as illustrated in the diagram, which shows four logical subbands 1004, 1006, 1008 and 1010, each composed of ten logical stripes. A particular stripe 1002 within the PPDCH's logical resources may be referenced via the logical subband index 1006 and the logical stripe index 1002 within that logical subband 1006. As shown in the diagram, logical subcarriers may begin with the lowest frequency subcarrier at the left and progress upwards in frequency while moving towards the right. Logical subbands may be indexed beginning with 0 and progress sequentially upwards with frequency.

In some embodiments, the number of useful subcarriers assigned to a PPDCH is an integer multiple of the subband-width for that same PPDCH, so that each PPDCH will always contain an integer number of subbands. However, there is no requirement that PPDCH assignments begin with subband 0 or end with subband N−1. In fact, the system may electively depopulate subbands at the band edges to facilitate spectrum sharing or otherwise constrain out-of-band emissions relative to a prescribed spectral mask.

Virtual Resources for a PPDCH

Corresponding to each logical subband (containing a number of logical stripes) is an equally-sized virtual subband containing the same number of virtual stripes, in some embodiments. Within each subband, there exists a one-to-one mapping of virtual stripes to logical stripes on a per OFDM symbol basis. This may be considered to be conceptually equivalent to shuffling the virtual stripes in order to obtain the logical stripes. A virtual subband has the same index as the corresponding logical subband, in some embodiments.

Figure 12:
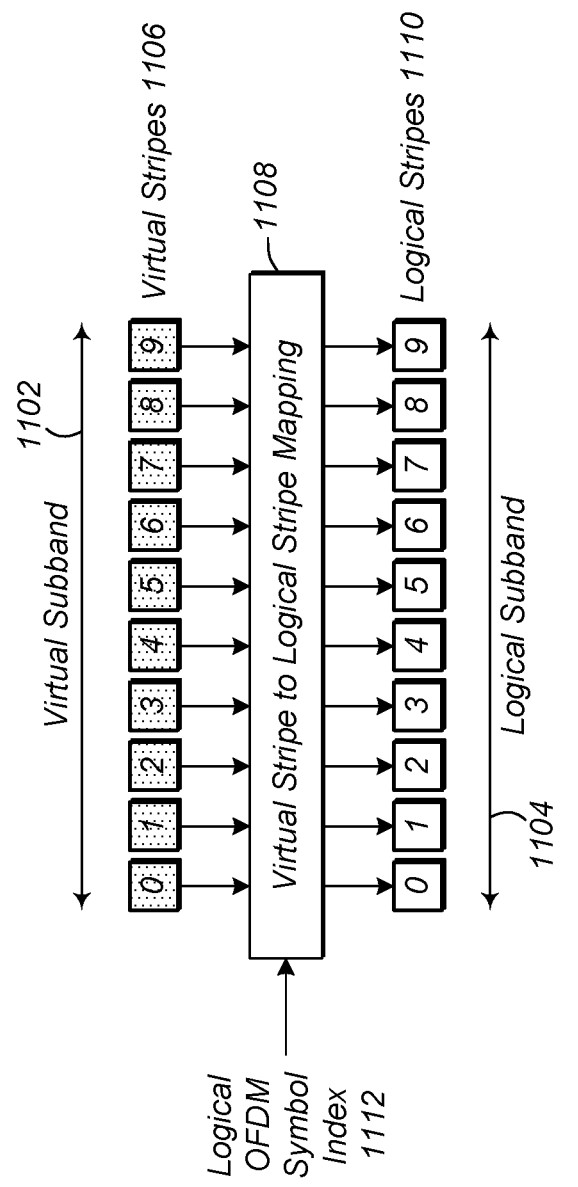
FIG. 12 illustrates a mapping of virtual stripes belonging to a virtual subband to logical stripes belonging to a logical subband, according to one embodiment.

FIG. 12 illustrates this concept with an example. In the illustrated example, each subband has a width of ten stripes ($W_{SB}$=10). The ten virtual stripes 1106 belonging to the virtual subband 1102 at the top have a one-to-one mapping 1108 to the ten logical stripes 1110 belonging to the logical subband 1104 at the bottom. The stripe mapping 1108 is dependent on the current logical OFDM symbol index 1112, and may therefore vary from one logical OFDM symbol to the next.

Table 6 contains an example virtual-to-logical stripe mapping while Table 7 contains a corresponding example logical-to-virtual stripe mapping. Note that the stripe mapping may vary as a function of the logical OFDM symbol index and has a periodicity of $P_{SM}$=10 in the time dimension in this example. Without loss of generality, it may be assumed that virtual stripe #0 is reserved for a reference symbol or pilot symbol, in some embodiments. In Table 7, the logical stripes that contain reference symbols (i.e. which map to virtual stripe #0) have been highlighted with boldface text to show the reference symbol pattern being used in this example. In this example, the reference symbol pattern repeats every five logical OFDM symbols, while the data stripe mapping pattern repeats every ten logical OFDM symbols.

In Table 6, the logical OFDM symbol index (row index) and the virtual stripe index (column index) may be used to determine the table entry that corresponds to the logical stripe index for that particular pair of logical OFDM symbol and virtual stripe indices. Conversely, in Table 7, the logical OFDM symbol index (row index) and the logical stripe index (column index) may be used to determine the table entry that corresponds to the virtual stripe index for that particular pair of logical OFDM symbol and logical stripe indices.

TABLE 6

Example virtual stripe to logical stripe mapping

| Logical OFDM symbol index mod 10 | Virtual stripe index | | | | | | | | | |
|---|---|---|---|---|---|---|---|---|---|---|
| | 0 | 1 | 2 | 3 | 4 | 5 | 6 | 7 | 8 | 9 |
| 0 | 0 | 2 | 3 | 4 | 5 | 6 | 7 | 8 | 9 | 1 |
| 1 | 4 | 8 | 9 | 0 | 1 | 2 | 3 | 5 | 6 | 7 |
| 2 | 8 | 4 | 5 | 6 | 7 | 9 | 0 | 1 | 2 | 3 |
| 3 | 2 | 0 | 1 | 3 | 4 | 5 | 6 | 7 | 8 | 9 |
| 4 | 6 | 7 | 8 | 9 | 0 | 1 | 2 | 3 | 4 | 5 |
| 5 | 0 | 3 | 4 | 5 | 6 | 7 | 8 | 9 | 1 | 2 |
| 6 | 4 | 9 | 0 | 1 | 2 | 3 | 5 | 6 | 7 | 8 |
| 7 | 8 | 5 | 6 | 7 | 9 | 0 | 1 | 2 | 3 | 4 |
| 8 | 2 | 1 | 3 | 4 | 5 | 6 | 7 | 8 | 9 | 0 |
| 9 | 6 | 8 | 9 | 0 | 1 | 2 | 3 | 4 | 5 | 7 |

TABLE 7

Example logical stripe to virtual stripe mapping

| Logical OFDM symbol index mod 10 | Logical stripe index | | | | | | | | | |
|---|---|---|---|---|---|---|---|---|---|---|
| | 0 | 1 | 2 | 3 | 4 | 5 | 6 | 7 | 8 | 9 |
| 0 | 0 | 9 | 1 | 2 | 3 | 4 | 5 | 6 | 7 | 8 |
| 1 | 3 | 4 | 5 | 6 | 0 | 7 | 8 | 9 | 1 | 2 |
| 2 | 6 | 7 | 8 | 9 | 1 | 2 | 3 | 4 | 0 | 5 |
| 3 | 1 | 2 | 0 | 3 | 4 | 5 | 6 | 7 | 8 | 9 |
| 4 | 4 | 5 | 6 | 7 | 8 | 9 | 0 | 1 | 2 | 3 |
| 5 | 0 | 8 | 9 | 1 | 2 | 3 | 4 | 5 | 6 | 7 |
| 6 | 2 | 3 | 4 | 5 | 0 | 6 | 7 | 8 | 9 | 1 |
| 7 | 5 | 6 | 7 | 8 | 9 | 1 | 2 | 3 | 0 | 4 |
| 8 | 9 | 1 | 0 | 2 | 3 | 4 | 5 | 6 | 7 | 8 |
| 9 | 3 | 4 | 5 | 6 | 7 | 8 | 0 | 9 | 1 | 2 |

As part of the set of parameters for each PPDCH, the following quantities may therefore be indicated.

(A) Subband width in the frequency dimension (in units of stripes (or subcarriers)).

(B) Stripe mapping periodicity in the time dimension (in units of logical OFDM symbols). Note that the number of logical OFDM symbols in a PPDCH is not required to be an integer multiple of the stripe mapping periodicity.

(C) Stripe mapping, which may be in the form of a table with the number of columns equal to the subband width and the number of rows equal to the stripe mapping periodicity. Alternatively, a more compact form of signaling the stripe mapping such as described in the following section may be used, in some embodiments.

In some embodiments, the concept of virtual OFDM symbols is not defined because virtual OFDM symbols are essentially directly equivalent to logical OFDM symbols (i.e. virtual OFDM symbol #N is the same as logical OFDM symbol #N).

Compact Signaling of Logical-to-Virtual Stripe Mapping

Signaling a complete logical-to-virtual stripe mapping over the air may result in an inefficient use of limited wireless resources due to the potential size of the stripe mapping table that should be transmitted for each PPDCH.

This section describes a more compact form of signaling the stripe mapping to be used at the receiver, in some embodiments. This compact signaling may allow the full logical to virtual stripe mapping table to be constructed at the receiver for each PPDCH.

Two desirable characteristics for a good virtual to logical stripe mapping (and vice versa) are as follows: (1) the stripe mapping should support the ability to have scattered reference symbols (e.g., the ability to map reference symbols to different logical stripes in different logical OFDM symbols) and (2) the stripe mapping should vary the virtual data stripes that are mapped to the logical stripes adjacent to the reference symbol to avoid some virtual data stripes consistently having better channel estimates than other virtual data stripes.

A stripe mapping algorithm for each PPDCH may include the following information, which may reduce the amount of information needing to be signaled over the air. Stripe mapping periodicity ($P_{SM}$) may be the same quantity as has previously been defined. A vector of reference symbol logical stripe mapping positions ($L_{RS}(k)$) with length equal to the stripe mapping periodicity may be determined. For each OFDM symbol k (modulo $P_{SM}$), this may specify the logical stripe to which virtual stripe 0 (which contains reference symbols) maps. This may allow the reference symbol position to be varied on an OFDM symbol by symbol basis. A vector of stripe rotation values with length equal to the stripe mapping periodicity may also be determined. For each OFDM symbol k (modulo $P_{SM}$), this may specify the "rotation" to be applied to either:
(1) the virtual stripes other than virtual stripe 0 (i.e. all of the virtual stripes that carry data rather than a reference symbol) in order to obtain logical stripe indices (this quantity may be labelled $R_{VL}(k)$) or (2) the logical stripes other than the logical stripe $L_{RS}(k)$ which carries the reference symbol (i.e. all of the logical stripes that carry data rather than a reference symbol) in order to obtain virtual stripe indices (this quantity may be labelled $R_{LV}(k)$).

Table 8 contains the compact form for specifying the stripe mapping for the example corresponding to Table 6 and Table 7, according to some embodiments. Recall that for this example, the stripe mapping periodicity is $P_{SM}=10$, and the width of the subband is $W_{SB}=10$. In addition, the relation between the virtual to logical and logical to virtual stripe rotations is simply $$R_{VL}(k)+R_{LV}(k)=W_{SB}-1.$$

TABLE 8

Example compact form for signaling of stripe mapping data

| Logical OFDM symbol index mod 10 (k) | Logical stripe for reference symbol ($L_{RS}(k)$) | Virtual to logical stripe rotation for data ($R_{VL}(k)$) | Logical to virtual stripe rotation for data ($R_{LV}(k)$) |
|---|---|---|---|
| 0 | 0 | 1 | 8 |
| 1 | 4 | 7 | 2 |
| 2 | 8 | 3 | 6 |
| 3 | 2 | 9 | 0 |
| 4 | 6 | 6 | 3 |
| 5 | 0 | 2 | 7 |
| 6 | 4 | 8 | 1 |
| 7 | 8 | 4 | 5 |
| 8 | 2 | 0 | 9 |
| 9 | 6 | 7 | 2 |

Figure 13:
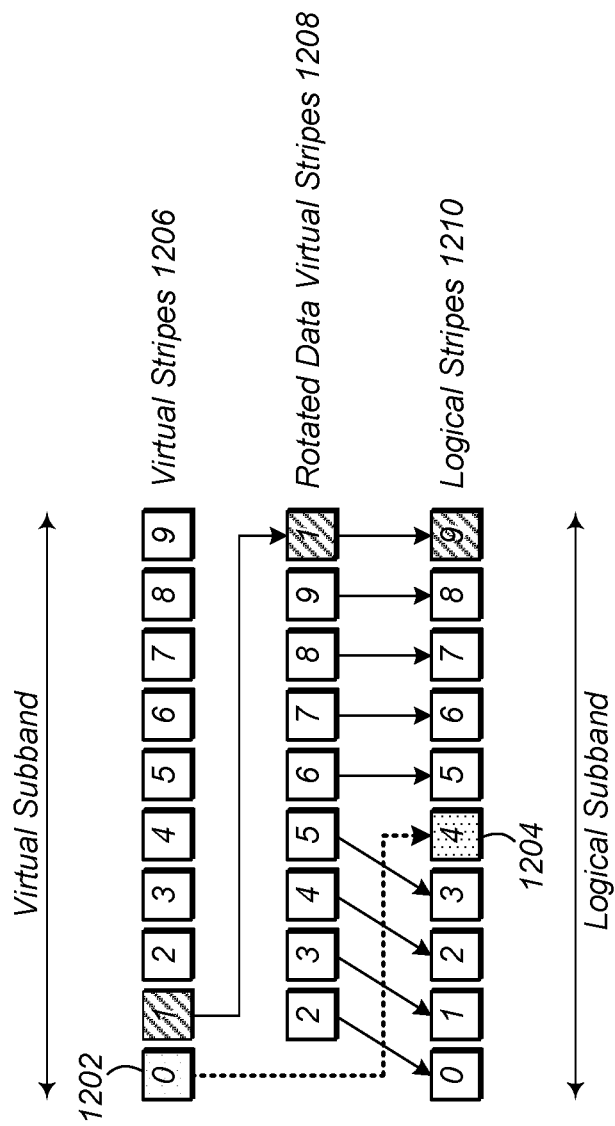
FIG. 13 illustrates an example rotation and mapping of virtual stripes to logical stripes, according to one embodiment.

FIG. 13 illustrates a conceptual view of how the virtual to logical stripe rotation works, in some embodiments. This example corresponds to modulo logical OFDM symbol k=6 from Table 8. As can be seen, the reference symbol on virtual stripe 0 (1202) is mapped straight through to logical stripe $L_{RS}(k)=4$ (1204). A rotation (modulo $W_{SB}=10$) of $R_{VL}(k)=8$ is applied to the data virtual stripes 1206, and then these rotated data virtual stripes 1208 are mapped essentially straight through to the available logical stripes 1210 (i.e. all of the logical stripes with the exception of logical stripe #4 (1204) which is already occupied by the reference symbol).

Figure 14:
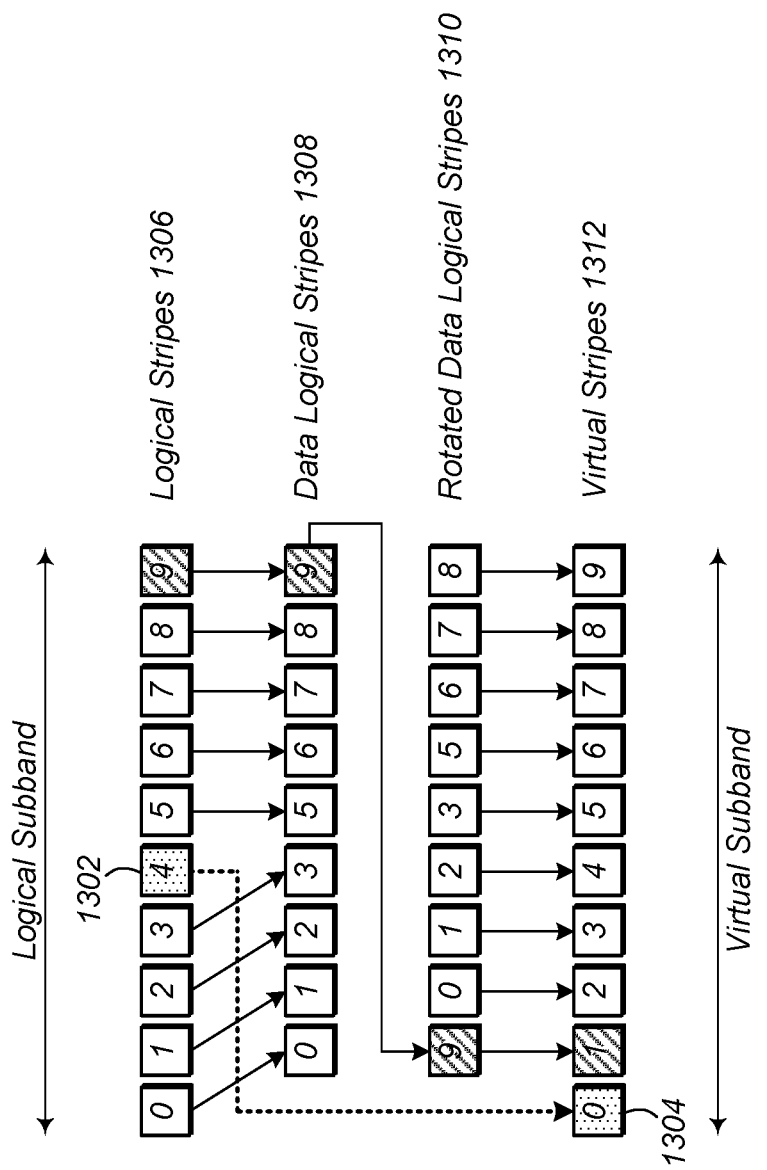
FIG. 14 illustrates an example rotation and mapping of logical stripes to virtual stripes, according to one embodiment.

FIG. 14 shows the corresponding logical to virtual stripe rotation and mapping for modulo logical OFDM symbol k=6 from Table 8. Here, the logical stripe carrying the reference symbol ($L_{RS}(k)=4$ (1302)) is extracted and mapped onto virtual stripe #0 (1304). A rotation (modulo $W_{SB}=10$) of $R_{LV}(k)=1$ is applied to the data logical stripes 1308, and then these rotated data logical stripes 1310 are mapped straight through onto the data virtual stripes 1312 (i.e. virtual stripes #1 through #9).

Let k represent the logical OFDM symbol index modulo the stripe mapping periodicity ($P_{SM}=10$, in this example). At the transmitter, a reference symbol for modulo symbol k is mapped from virtual stripe index 0 to the corresponding logical stripe index $L_{RS}(k)$ ($0 \le L_{RS}(k) < W_{SB}$) given in the table.

$$S_L(k,L_{RS}(k))=S_V(k,0)$$

At the receiver, this process is reversed, and a reference symbol for modulo symbol k is mapped from the corresponding logical stripe index $L_{RS}(k)$ given in the table back to virtual stripe index 0.

$$S_V(k,0)=S_L(k,L_{RS}(k))$$

For virtual to logical data stripe mapping at the transmitter, the following procedure may be followed. Let $S_V(k,i)$ ($0<S_V(k,i)<W_{SB}$) and $S_L(k,i)$ ($0 \le S_L(k,i) < W_{SB}$ and $S_L(k,i) \ne L_{RS}(k)$) represent a corresponding pair of virtual and logical stripe indices that map to each other for modulo symbol k ($0 \le k \le P_{SM}$). Let $R_{VL}(k)$ ($0 \le R_{VL}(k) < W_{SB}$ and $R_{VL}(k) \ne (L_{RS}(k)+W_{SB}-1) \mod W_{SB}$) represent the virtual to logical stripe rotation for data for modulo symbol k. The logical data stripe index $S_L(k,i)$ corresponding to a particular virtual data stripe index $S_V(k,i)$ ($0<i<W_{SB}$) may then be calculated as follows, noting that for a valid stripe mapping $R_{VL}(k) \ne (L_{RS}(k)+W_{SB}-1) \mod W_{SB}$ implies that $R_{VL}(k)+1 \ne L_{RS}(k)$ for all k.

$$\tilde{L}(k) = \begin{cases} L_{RS}(k) & \text{if } R_{VL}(k)+1 < L_{RS}(k) \\ L_{RS}(k)+W_{SB} & \text{if } R_{VL}(k)+1 > L_{RS}(k) \end{cases}$$

$$i = 1 \ldots W_{SB}-1$$

$$S_V(k,i) = i$$

$$\tilde{S}(k,i) = S_V(k,i) + R_{VL}(k)$$

$$S_L(k,i) = \begin{cases} \tilde{S}(k,i) \mod W_{SB} & \text{if } \tilde{S}(k,i) < \tilde{L}(k) \\ (\tilde{S}(k,i)+1) \mod W_{SB} & \text{if } \tilde{S}(k,i) \ge \tilde{L}(k) \end{cases}$$

At the receiver, the virtual data stripe index $S_V(k,i)$ corresponding to a particular logical data stripe index $S_L(k,i)$ ($0 \le i < W_{SB}$ and $i \ne L_{RS}(k)$) may then be calculated as shown below. $R_{LV}(k)=W_{SB}-R_{VL}(k)-1$ represents the virtual to logical stripe rotation for data for modulo symbol k.

$$x(k) = W_{SB} - R_{LV}(k)$$

$$i = 0 \ldots W_{SB} - 1 \text{ and } i = L_{RS}(k)$$

$$S_L(k, i) = i$$

If $x(k) < L_{RS}(k)$: $S_V(k, i) =$ $$\begin{cases} (S_L(k, i) + R_{LV}(k)) \bmod W_{SB} & \text{if } S_L(k, i) < x(k) \text{ or } \\ & S_L(k, i) > L_{RS}(k) \\ (S_L(k, i) + R_{LV}(k) + 1) \bmod W_{SB} & \text{if } x(k) \le S_L(k, i) < L_{RS}(k) \end{cases}$$

Conversely, if $x(k) \ge L_{RS}(k)$: $S_V(k, i) =$ $$\begin{cases} (S_L(k, i) + R_{LV}(k)) \bmod W_{SB} & \text{if } L_{RS}(k) < S_L(k, i) < x(k) \\ (S_L(k, i) + R_{LV}(k) + 1) \bmod W_{SB} & \text{if } S_L(k, i) < L_{RS}(k) \text{ or } \\ & S_L(k, i) \ge x(k) \end{cases}$$

Table 9 summarizes the list of parameters to be provided for each PPDCH within the PFDCH, in some embodiments.

TABLE 9

Summary of parameters for each PPDCH

| Parameter Category | Parameter |
|---|---|
| General | PPDCH index (may be implicitly signaled by position within a list of PPDCHs) |
| | FFT size |
| | Cyclic prefix length (in samples) |
| Time dimension | Total number of OFDM symbols assigned to this PPDCH |
| | Absolute OFDM symbol starting position within the PFDCH for this PPDCH |
| Frequency dimension | Number of useful subcarriers assigned to this PPDCH (should be an integer multiple of the subband width further below) |
| | Absolute index of the first subcarrier belonging to this PPDCH |
| Stripe mapping | Subband width in the frequency dimension (in units of stripes or subcarriers) |
| | Stripe mapping periodicity in the time dimension (in units of logical OFDM symbols) |
| | Virtual↔Logical stripe mapping table or compact stripe mapping signaling format |

Mapping a PSDCH to Virtual Resources

Virtual stripe #0 may always be reserved for reference symbols, in some embodiments. This does not result in any loss of generality since virtual stripe #0 may be mapped to any desired logical stripe.

The reference symbol density may be calculated as the reciprocal of the subband width. In the examples given above with a subband width of 10, the reference symbol density is 10%. Conversely, any of various desired reference symbol densities may be used to obtain the appropriate subband width to configure.

A subband block is defined as a set of resource elements measuring one subband in the frequency dimension by one OFDM symbol in the time dimension. Resources may be allocated to a PSDCH in units of subband blocks, where a subset of the virtual stripes within each virtual subband may be assigned to a particular PSDCH.

Virtual resources may be assigned to a PSDCH via the following parameters, in some embodiments:

Total number of subband blocks allocated to this PSDCH.
Subband index of the first subband block allocated to this PSDCH.
Number of consecutive subband blocks per subband cluster period allocated to this PSDCH (Subband cluster size). The first subband for a logical OFDM symbol is considered to be consecutive to the last subband for the preceding logical OFDM symbol.
Subband cluster periodicity for this PSDCH. This specifies the periodicity of successive subband clusters that are allocated to this PSDCH.
Index of the first allocated virtual stripe within a virtual subband for this PSDCH.
Number of consecutive allocated virtual stripes within a virtual subband for this PSDCH. (Stripe cluster size)
Index of the first logical OFDM symbol occupied by this PSDCH.
Number of consecutive logical OFDM symbols per logical OFDM symbol cluster occupied by this PSDCH. (Logical OFDM symbol cluster size)
Logical OFDM symbol cluster periodicity for this PSDCH.

Note that the total number of resource elements allocated to a PSDCH may be obtained by multiplying the total number of allocated subband blocks by the number of consecutive allocated virtual stripes within a virtual subband.

Figure 15:
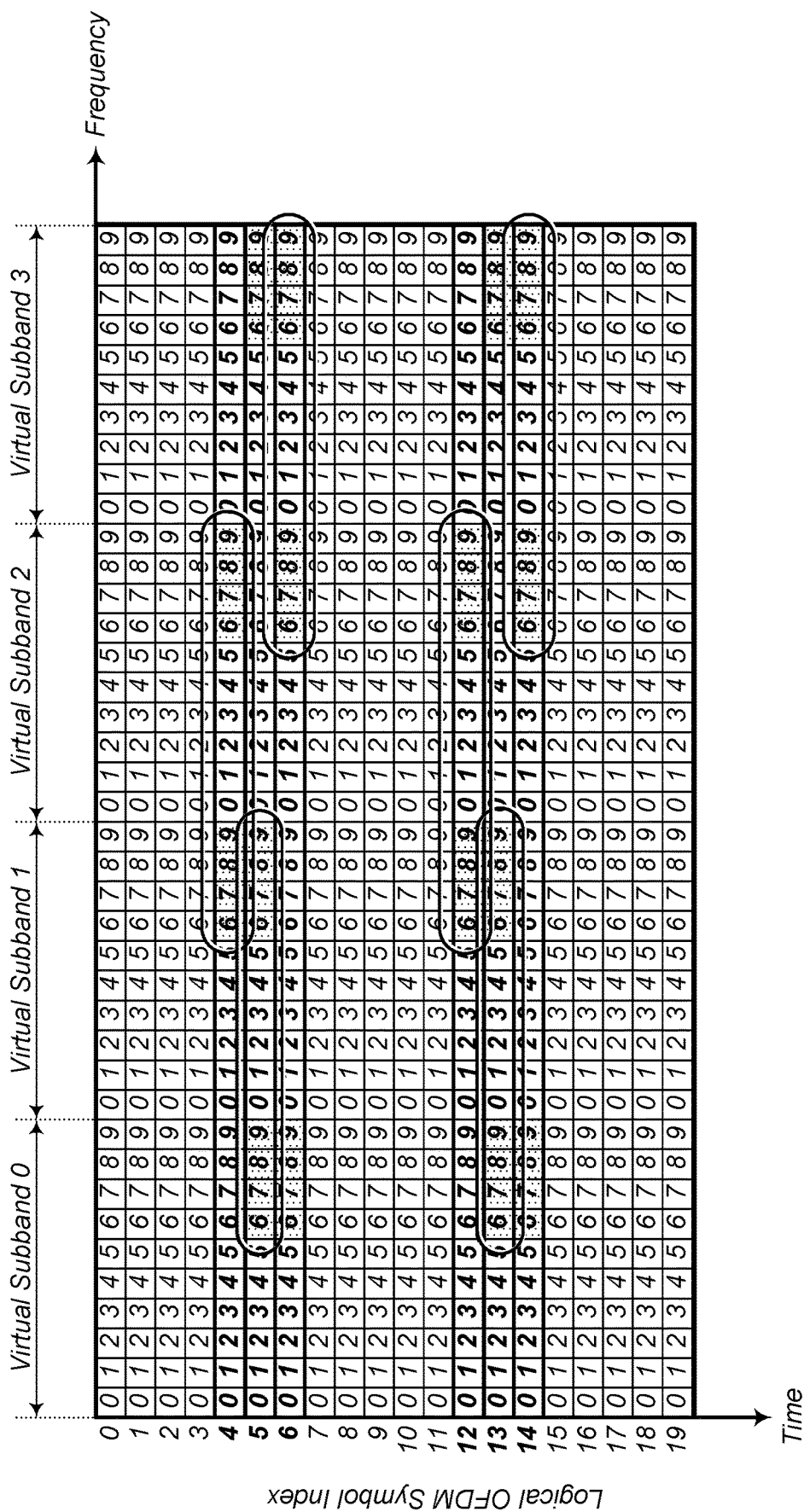
FIG. 15 illustrates an example of mapping a Physical Service Data CHannel (PSDCH) to virtual resources of a PPDCH, according to one embodiment.

FIG. 15 illustrates how the above parameters may be used to map a PSDCH onto a set of virtual resources within a PPDCH. Table 10 contains the parameters that correspond to the example PSDCH mapping shown in FIG. 15. In this example, the total number of resource elements allocated to this PSDCH is equal to 16 (total number of allocated subband blocks) multiplied by 4 (number of consecutive allocated virtual stripes within a virtual subband), which equals 64. In the diagram, most but not all of the subband clusters have been circled to show which subbands belong to which subband clusters.

TABLE 10

Example PSDCH virtual resource mapping parameters

| Parameter | Value |
|---|---|
| Total number of allocated subband blocks | 16 |
| Subband index of first subband block | 1 |
| Subband cluster size | 2 |
| Number of consecutive subband blocks per subband cluster period | |
| Subband cluster periodicity | 3 |
| Index of first allocated virtual stripe within a virtual subband | 6 |
| Stripe cluster size | 4 |
| Number of consecutive allocated virtual stripes within a virtual subband | |
| Index of first occupied logical OFDM symbol | 4 |
| Logical OFDM symbol cluster size | 3 |
| Number of consecutive logical OFDM symbols per OFDM symbol period | |
| Logical OFDM symbol cluster periodicity | 8 |

Within a virtual resource mapping for a PSDCH, modulation symbols may be mapped to resource elements beginning with the first allocated virtual stripe of the first allocated subband block of the first occupied logical OFDM symbol, and progressing by virtual stripe within each subband block, then by subband block within the same logical OFDM symbol, and finally by logical OFDM symbol.

In the above example, modulation symbols will be mapped to virtual stripes 6/7/8/9 of virtual subband 1 and logical OFDM symbol 4, then to virtual stripes 6/7/8/9 of virtual subband 2 and logical OFDM symbol 4, then to virtual stripes 6/7/8/9 of virtual subband 0 and OFDM symbol 5, then to virtual stripes 6/7/8/9 of virtual subband 1 and OFDM symbol 5, and so on until the total number of allocated subband blocks has been processed.

Frame Content Description Provided to the Receiver

Information about the payload content formatting of each frame, including information on the encoding, FFT sizes, etc, should be provided to the receiver to facilitate the receiver processing and decoding of the payload contents. There are a variety of methods that may be used to communicate this formatting information to the receiver. For example, the payload content descriptions could be signaled within each frame in one of the non-payload regions shown in FIG. 2. Alternatively, if the payload content structure varies more slowly than on a frame-by-frame basis, then the payload content descriptions could be signaled on an as-required basis.

In general, the receiver should be provided with descriptions of the following items.

Number of distinct PPDCHs in the frame
For each PPDCH:
Physical resources allocated to that PPDCH. This may include the number of OFDM symbols allocated to that PPDCH, as well as which particular symbols are allocated to that PPDCH.
FFT size
Cyclic prefix length
Number of PSDCHs in the frame.
For each PSDCH
Service associated with that PSDCH. (The service may be thought of as the data stream flow to which a particular PSDCH belongs. For example, a specific television program may be considered to be a particular service.)
Physical resources allocated to that PSDCH.
Modulation used for that PSDCH.
Transport block size (bytes).

Table 11, Table 12, and Table 13 provide more detailed descriptions of the parameter fields to be provided to the receiver. One PFDCH descriptor (Table 11) may be provided for each frame. One PPDCH descriptor (Table 12) may be provided for each PPDCH contained in the frame. One PSDCH descriptor (Table 13) may be provided for each PSDCH contained in the frame.

TABLE 11

PFDCH descriptor
Field description

Number of PPDCHs

TABLE 12

PPDCH descriptor
Field description

FFT size
(e.g. 2048, 4096, 8192, 16384, 32768, 65536)
Cyclic prefix length
Total number of OFDM symbols in this PPDCH
Absolute OFDM symbol starting position for this PPDCH
Number of useful subcarriers for this PPDCH
Absolute index of the first subcarrier belonging to this PPDCH
Subband width
(Note that the number of useful subcarriers belonging to the PPDCH should be an integer multiple of the subband width)
Stripe mapping periodicity in the time dimension
Logical-to-virtual stripe mapping table
or
Compact stripe mapping parameters
Number of PSDCHs in the PPDCH

TABLE 13

PSDCH descriptor
Field description

Figure 16:
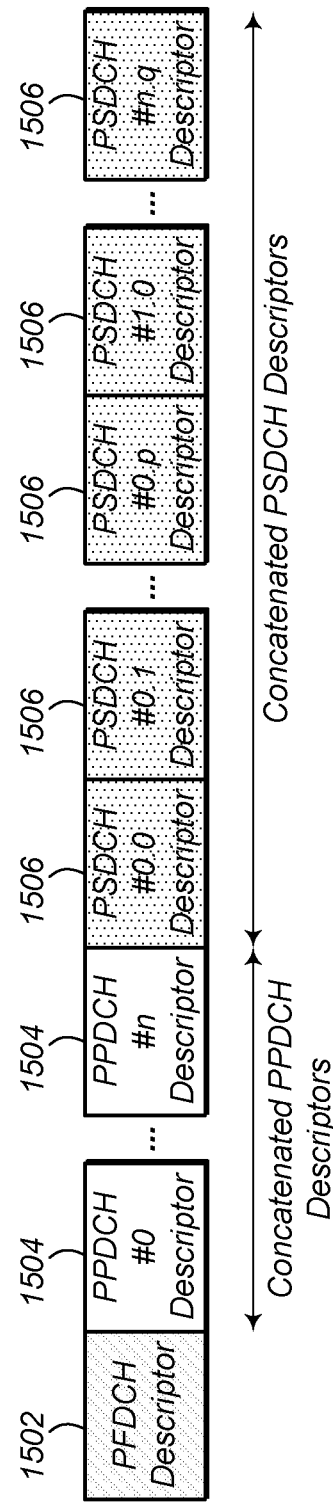
FIG. 16 illustrates an example of concatenated PFDCH, PPDCH, and PSDCH descriptors for communication to a receiver, according to one embodiment.

Service associated with this PSDCH
Transport block size
FEC coding type
(e.g. Turbo, Low Density Parity Check (LDPC))
Modulation level
(e.g. QPSK, 16QAM, 64QAM, 256QAM)
Total number of subband blocks for this PSDCH
Subband index of the first subband block for this PSDCH
Subband cluster size for this PSDCH
Subband cluster periodicity for this PSDCH
Index of the first allocated virtual stripe within a virtual subband for this PSDCH
Number of consecutive allocated virtual stripes within a virtual subband for this PSDCH
Index of the first logical OFDM symbol occupied by this PSDCH
Logical OFDM symbol cluster size
(Number of consecutive logical OFDM symbols per OFDM symbol period occupied by this PSDCH)
Logical OFDM symbol cluster periodicity for this PSDCH FIG. 16 shows an example of how the various descriptors may be communicated to the receiver. In this example, the single PFDCH descriptor 1502 per frame occurs first, immediately followed by all of the concatenated PPDCH descriptors 1504 (this example frame contains n+1 PPDCHs), which in turn are followed by all of the concatenated PSDCH descriptors 1506 (in this example frame, PPDCH #0 has p+1 PSDCHs and PPDCH #n has q+1 PSDCHs).

The ordering of the descriptors shown in FIG. 16 may be rearranged if so desired. For example, the PSDCH descriptors associated with a particular PPDCH may follow immediately after the descriptor for that PPDCH, instead of all being concatenated together following the group of concatenated PPDCH descriptors.

In one set of embodiments, a method 1700 for constructing and transmitting a frame may include the actions shown in FIG. 17. (The method 1700 may also include any subset of the features, elements and embodiments described above.) The method may be implemented by a base station (or access point).

At 1710, digital circuitry of the base station may receive (e.g., from a broadcast gateway) or generate a payload region for a frame of wireless data. In the illustrated embodiment, the payload region includes a plurality of partitions that each include multiple orthogonal frequency-division multiplexing (OFDM) symbols. In the illustrated embodiment, different ones of the partitions have different frequency transform sizes for the OFDM symbols in the ones of the partitions.

At 1720, a transmitter of the base station may transmit the frame of wireless data, including the payload region, over a wireless channel.

In some embodiments, the operations also include embedding partition information (which may also be referred to as signaling information) in a non-payload region of the frame, e.g., as variously described above. The partition information may indicate the FFT size and/or the cyclic prefix size for each of the partitions. In other embodiments, the signaling information may be embedded elsewhere, e.g., in a previous frame.

In some embodiments, different ones of the partitions have different cyclic prefix sizes (e.g., different percentages of the OFDM symbols in the different partitions may be used as a cyclic prefix). In some embodiments, the partitions may be used to convey different content, e.g., local v. regional programming.

In some embodiments, each of the partitions includes a corresponding set of overhead resource elements (such as reference symbols). In these embodiments, the above-described operations may also include scheduling symbol data from one or more service data streams to each of the partitions after having reserved the overhead resource elements within the frame.

Different partitions may have different values of FFT size, and thus, different values of subcarrier spacing. (As discussed above, the subcarrier spacing for any given partition is the ratio of sample rate to the FFT size for that partition.) Consequently, the different partitions will have different amounts of Doppler tolerance (i.e., tolerance to Doppler shift due to motion of user devices). For example, a first of the partitions may be targeted for transmission to mobile devices, while a second of the partitions is targeted for transmission to fixed devices. Thus, the FFT size corresponding to the first partition is configured to be smaller than the FFT size corresponding to the second partition. This allows the first partition to have larger subcarrier spacing, and thus, greater tolerance to the frequency shift of subcarriers due to motion of the mobile devices.

Furthermore, different partitions may have different cyclic prefix sizes (or guard interval durations), and thus, be able to tolerate different amounts of delay spread. For example, a first of the partitions may be targeted for transmission to a first set of user devices that are expected to have large delay spreads, while a second of the partitions is targeted for transmission to a second set of user devices that are expected to have smaller delay spreads. Thus, the cyclic prefix size for the first partition is configured to be larger than the cyclic prefix size for the second partition, in some embodiments.

A given user device may receive the transmitted frame using a wireless receiver, and extract the OFDM symbols from the partition to which the user device has been assigned. The OFDM symbols are decoded to obtain digital information signals, which are then displayed or otherwise outputted to a user. (The base station may signal to each user device or each type of user device the partition to which it is assigned. The base station may also signal the type of service carried in each partition.)

Thus, in some embodiments, a mobile device may include a wireless radio, one or more antennas, and one or more processors. In some embodiments, the mobile device is configured to receive, using the wireless radio, a frame of wireless data that includes a plurality of partitions and partition data. In some embodiments, the plurality of partitions each include multiple orthogonal frequency-division multiplexing (OFDM) symbols, and different ones of the partitions have different frequency transform sizes (e.g., different FFT sizes). In some embodiments, the partition data indicates the frequency transform sizes for the ones of the partitions. In some embodiments, the mobile device is configured to select, based on the partition data, one or more of the plurality of partitions and decode the selected one or more partitions to determine data represented by the OFDM symbols in the selected one or more partitions.

In some embodiments, the mobile device may select the one or more partitions based on a current velocity of the mobile device. For example, the mobile device may select a partition with a smaller FFT size when it is moving above a threshold velocity (or expects to move above the threshold velocity, has recently moved above the threshold velocity, etc.). In some embodiments, the mobile device may select a partition based on user input, e.g., whether to view local or regional content. In some embodiments, the mobile device may select a partition based on instructions from the broadcasting base station.

The selected one or more partitions may include one or more service data streams, as variously described herein. In the case that the partition includes more than one service data stream, the user device may extract OFDM symbols from one or more of the service data streams for which it has been granted permission to access. The base station may signal to the user device which service data streams it is permitted to access, e.g., based on permission control information provided by the broadcast gateway.

Contrasts with DVB

Digital Video Broadcasting—Second Generation Terrestrial (DVB-T2 includes a Future Extension Frame (FEF) as a mechanism to enable a mixed Super Frame (SF) structure. According to DVB, the mixed Super Frame may permit the same network to transmit in the same frequency band both fixed and mobile TV services each with an optimized waveform (i.e. time segmented transmission of T2 and FEF frames).

To preserve backward compatibility, DVB-T2 imposes several constraints listed as follows to allow the introduction of FEFs.

The ratio of T2 frames to FEFs is fixed and is repeated inside a SF.

An SF should start with a T2-frame and should end with a FEF.

It is not possible to have 2 consecutive FEFs.

The present disclosure imposes no such constraints. For example:

The ratio of transport resources allocated between FFT modes (and respective partitions) is determined statistically, in some embodiments, based on the respective configuration in each mode, i.e. FFT size, CP duration, and payload extent in symbols.

There are no restrictions on the FFT mode inserted at either the start or end of a frame, in some embodiments.

The FFT modes will repeat in succession as needed to satisfy the statistical multiplexing arrangement, in some embodiments.

The present disclosure further permits the option to separate partitions in the frequency domain, i.e., confining each partition to separate sets of subcarriers. This is a capability not readily addressable within DVB.

Efforts to merge different FFT modes within a single DVB frame would require a change in the preamble structure, undermining backward compatibility with legacy receivers. Given the manner in which frames are multiplexed in DVB, confined to separate P1 preamble regions, there is no gain in time diversity. Restrictions imposed on the ratio of T2 to Future Extension Frames limits the usefulness of this DVB multiplexing arrangement to a limited set of hand-crafted use case scenarios.

Any of the various embodiments described herein may be realized in any of various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   one or more processing elements configured to:
      receive, via a wireless radio, a transport frame of broadcast wireless data that includes:
         a plurality of portions, wherein different ones of the portions encode different types of video content; and
         control data that indicates the types of video content encoded by the ones of the portions;
      select, based on the control data and whether the apparatus is a fixed or mobile device, one or more of the plurality of portions; and
      decode the selected one or more portions to determine data represented by symbols in the selected one or more portions.

2. The apparatus of claim 1, wherein one or more of the portions of the transport frame are time division multiplexed.

3. The apparatus of claim 1, wherein one or more of the types of video content encoded by the ones of the portions have different video quality levels.

4. The apparatus of claim 1, wherein one or more of the types of video content encoded by the ones of the portions include different programming content.

5. The apparatus of claim 1, wherein one or more of the types of video content encoded by the ones of the portions use different video encoding techniques.

6. The apparatus of claim 1, wherein one or more of one or more of the portions of the transport frame have different frequency transform sizes.

7. The apparatus of claim 1, wherein the control data is specified at the transport layer.

8. The apparatus of claim 1, wherein the apparatus is configured to determine whether it is a fixed or mobile device based on current operating conditions of the apparatus.

9. A method, comprising:
   receiving or generating, by a computing system:
      data for a transport frame for wireless broadcast transmission, wherein the data includes:
         a plurality of portions, wherein different ones of the portions encode different types of video content; and
         control data that indicates the types of video content encoded by the ones of the portions; and
   causing, by the computing system, the transport frame to be wirelessly broadcast.

10. The method of claim 9, wherein one or more of the portions of the transport frame are time division multiplexed.

11. The method of claim 9, wherein one or more of the types of video content encoded by the ones of the portions have different video quality levels.

12. The method of claim 9, wherein one or more of the types of video content encoded by the ones of the portions use different video encoding techniques.

13. The method of claim 9, wherein one or more of one or more of the portions of the transport frame have different frequency transform sizes that target fixed and mobile receivers, respectively.

14. The method of claim 9, wherein the control data is specified at the transport layer.

15. A non-transitory computer-readable medium having instructions stored thereon that are executable by an electronic device to perform operations comprising:
   receiving, via a wireless radio, a transport frame of broadcast wireless data that includes:
      a plurality of portions, wherein different ones of the portions encode different types of video content; and
      control data that indicates the types of video content encoded by the ones of the portions;
   selecting, based on the control data and whether the electronic device is a fixed or mobile device, one or more of the plurality of portions; and
   decoding the selected one or more portions to determine data represented by symbols in the selected one or more portions.

16. The non-transitory computer-readable medium of claim 15, wherein one or more of the types of video content encoded by the ones of the portions have different video quality levels.

17. The non-transitory computer-readable medium of claim 15, wherein one or more of the types of video content encoded by the ones of the portions include different programming content.

18. The non-transitory computer-readable medium of claim 15, wherein one or more of the types of video content encoded by the ones of the portions use different video encoding techniques.

19. The non-transitory computer-readable medium of claim 15, wherein one or more of the portions of the transport frame have different frequency transform sizes.

* * * * *